US008490824B1

(12) United States Patent
Green, Jr. et al.

(10) Patent No.: US 8,490,824 B1
(45) Date of Patent: Jul. 23, 2013

(54) BOMB RESISTANT GARBAGE RECEPTACLE

(76) Inventors: William P. Green, Jr., Mobile, AL (US); David Fannon, Daphne, AL (US)

( * ) Notice: Subject to any disclaimer, the term of this patent is extended or adjusted under 35 U.S.C. 154(b) by 1981 days.

(21) Appl. No.: 10/703,653

(22) Filed: Nov. 7, 2003

Related U.S. Application Data

(60) Provisional application No. 60/424,911, filed on Nov. 7, 2002, provisional application No. 60/450,312, filed on Feb. 27, 2003.

(51) Int. Cl.
*A47J 39/00* (2006.01)
*B65D 1/40* (2006.01)

(52) U.S. Cl.
USPC ...................... 220/592.2; 220/908; 220/62.15

(58) Field of Classification Search
USPC ............... 220/484, 592.2, 62.15, 908; 405/53
See application file for complete search history.

(56) References Cited

U.S. PATENT DOCUMENTS

| | | | | |
|---|---|---|---|---|
| 1,158,958 | A * | 11/1915 | Baumann | 220/87.1 |
| 4,889,258 | A * | 12/1989 | Yerushalmi | 220/560.01 |
| 5,156,290 | A * | 10/1992 | Rodrigues | 220/87.1 |
| 5,421,479 | A * | 6/1995 | Noorafshani | 220/571 |
| 6,805,815 | B1 * | 10/2004 | Soundararajan | 252/478 |
| 2003/0213802 | A1 * | 11/2003 | Reynolds | 220/62.15 |
| 2005/0115384 | A1 * | 6/2005 | Reynolds | 86/50 |

* cited by examiner

*Primary Examiner* — Bryon Gehman
*Assistant Examiner* — Shawn Braden
(74) *Attorney, Agent, or Firm* — Mark Loftin

(57) ABSTRACT

A garbage can for controlling an explosive charge generating an explosive force having an outer shell having vertical walls and a bottom; an inner shell attached to the bottom having vertical walls and a middle wall attached to the bottom between the outer shell and inner shell. A first layer of compressible material between the outer shell and middle shell and a second layer of compression material is between the middle shell and the inner shell. The compression material itself may different from one layer to the other. The walls and material are shaped to direct the explosive force upward.

12 Claims, 26 Drawing Sheets

FIGURE 10A
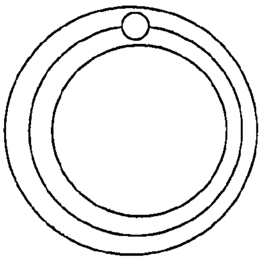
FIGURE 10B
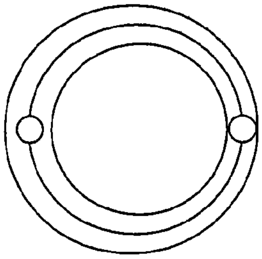
FIGURE 10C
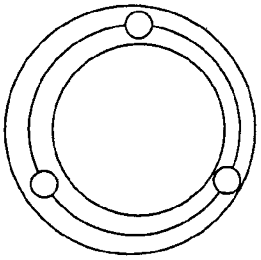
FIGURE 10D
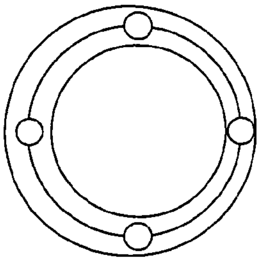
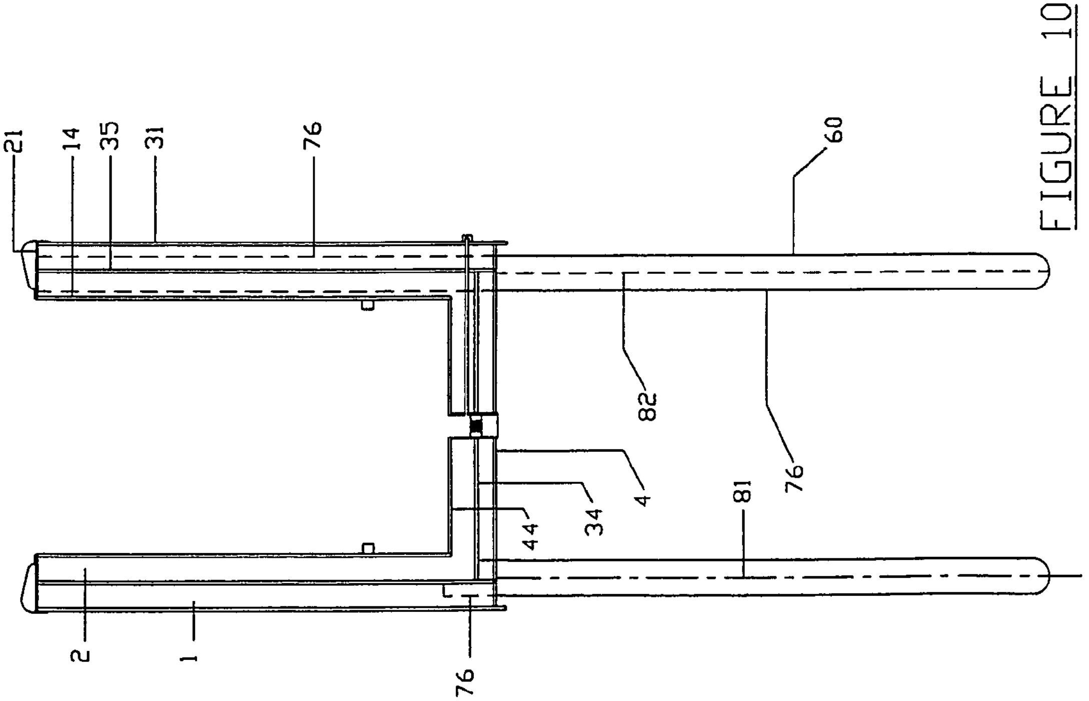
FIGURE 10

BOMB RESISTANT GARBAGE RECEPTACLE

This patent is a continuation of Provisional Patent 60/424,911 filed Nov. 7, 2002 and Provisional Patent 60/450,312 filed Feb. 27, 2003.

BACKGROUND OF INVENTION

Field of Invention

1. Prior Art

The prior art shows garbage cans having blast reduction chambers filled with specialized blast absorptions and also having top covers and drains.

2. General Description of the Invention

One of the problems is that these types of covers don't take into account certain features of modern terrorism which include double explosions where first a smaller explosion is designed in order to attract attention to the device and a second explosion follows immediately thereafter.

Also, for some of the more sophisticated explosives in terrorists devices, the cans are unable in the space provided to give sufficient blast protection at an acceptable cost.

Another problem connected with these cans is that they tend to be extremely heavy, and loading and unloading the cans can be cumbersome and often leads to the inability to effectively utilize garbage bags.

In fact, garbage bags even with non-industrial explosive proof cans cannot not be effectively utilized without significant modification and significant trouble loading and unloading the bags. The present invention provides a garbage can which has multiple layers preferably caused by having inner and outer walls. These layers provide for a change in the phase of the materials as the blast moves from inside the container to the outside of the container. Various modifications can be made particularly of the inner wall in order to enhance this effect.

The can is also designed in order to make use of traditional insertable plastic bags easier.

It is therefore a purpose of the invention to provide for an explosion proof garbage can which is easily assembled.

It is another purpose of the invention to provide for a garbage can with an easily removable liner.

It is further a purpose of the invention provide for a garbage can which allows for fixed attachment to an embedded face.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF THE DRAWINGS

For a further understanding of the nature and objects of the present invention, reference should be made to the following detailed description taken in conjunction with the accompanying drawings in which like parts are given like reference numerals and wherein:

FIG. 6*a* shows the side view of the liner of FIG. 6.

FIG. 9*f* shows a side cross sectional view of the washer from FIG. 9*e*.

FIG. 10 shows an alternate securing means utilizing posts.

FIG. 10*a* shows a top cross section showing the placement of the posts.

FIG. 10*b* shows an alternate placement of posts.

FIG. 10*c* shows an alternate placement of posts.

FIG. 10*d* shows an alternate placement of posts.

FIG. 15*a* shows the placement of cans shown in FIG. 15 from a side view.

DETAILED DESCRIPTION OF THE PREFERRED EXEMPLARY EMBODIMENTS

Figure 1:
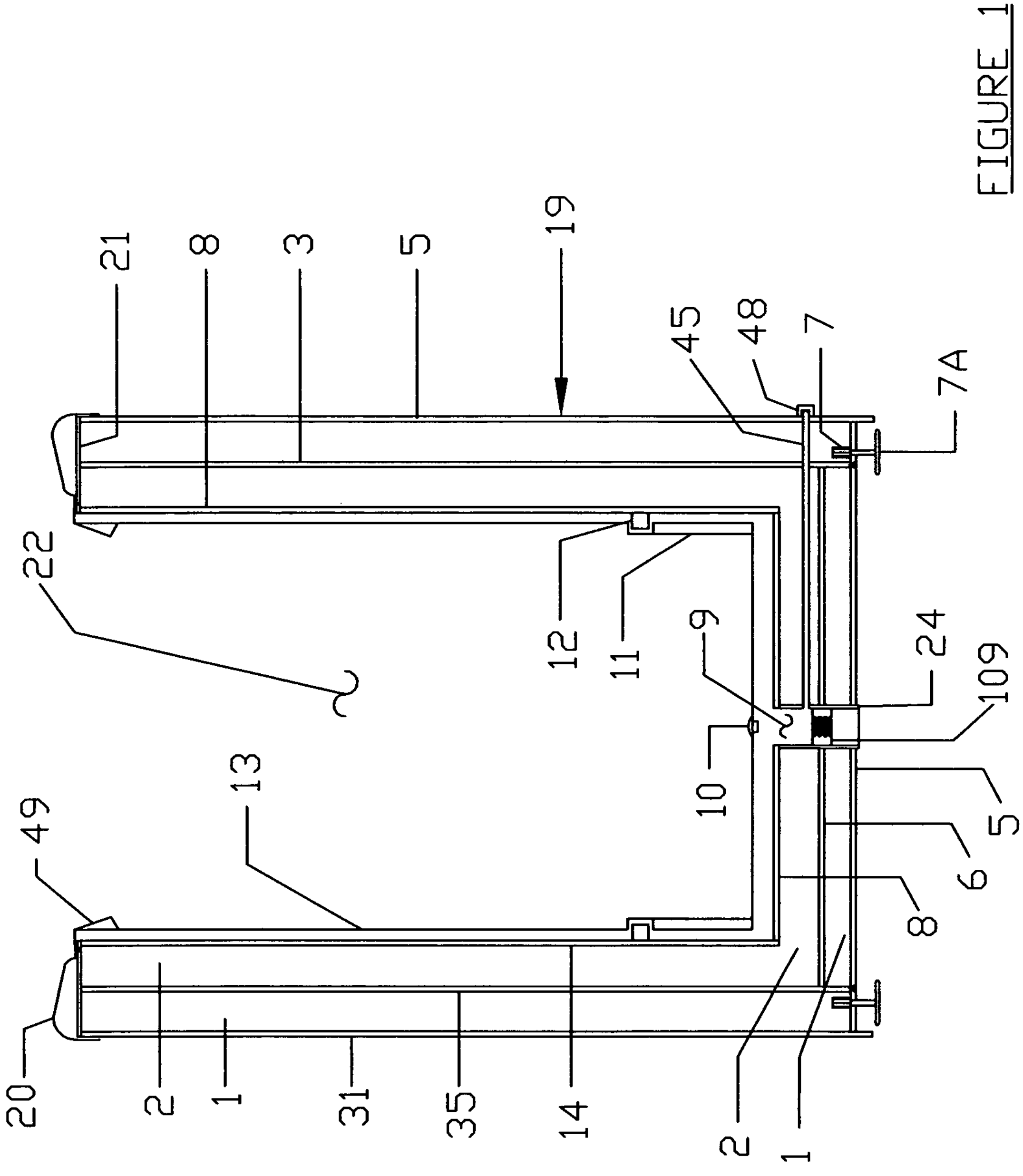
FIG. 1 shows a cross section of the preferred embodiment of the invention.

As can best be seen by reference to FIG. 1, the invention comprises a first outer shell 5 which is preferably steel or material of comparable strength. The outer shell has a bottom 4 and an outer vertical wall 31.

This outer shell 5 is connected at the bottom 4 of the outer shell 5, with the center base 6 of a center shell 3, which is preferably made of comparable material (steel). The center shell has the base 6 and a vertical middle wall 35.

Between the vertical middle wall 35 of the center shell 3 and the vertical outer wall 31 of the outer shell 5 is a first layer 1 of compression material which is preferably a standard hot mix asphalt with or without additive materials for increased compressibility such as recycled ground rubber, ash, shale, perlite and/or mixtures and combinations of these or their equivalents.

One example of an alternate or staggered layering of materials would be to use water, ground rubber, asphalt, carbon foam, recycled tire, ash, shell, prolite and/or mixtures, and combinations of these or their equivalent. Equivalents are usually determined for these in terms of materials with similar modules of electricity.

While in the preferred embodiment, the compression material layer 1 is described as a single material; in alternate embodiments, a number of different materials are suggested in order to obtain a change in phase which alters the composition of the blast. In order to accomplish this, materials which might be used are kevlar, ceramics, composts, rubber, asphalt, foam and various other materials of liquid, solid and gas phases and combinations thereof.

One type of foam which would work would be a carbon foam but other blast resistant foams could be substituted without departing from the teaching of the patent.

In addition the materials may be layered in various densities or in various types from bottom to top or from inside to outside in order to dampen or deflect the direction of the explosion.

The middle wall preferably has a tensile strength greater than 0.30 by the Poisson's ratio.

The first layer 1 and at least one second layer 2 of compressible material has a modulus of elasticity (E) between 600 and 20,000 of resilience between 12 and 36 in-lb per cubic inch.

The first layer 1 and at least one second layer 2 may be comprised of materials having different phases from the group consisting of solid, liquid, water, gas, inert gas and combinations thereof.

There is also an inner shell 8 with a vertical inner wall 14. The inner shell has an inner base 44, the top of which defines the bottom of the interior 22 of the chamber.

Figure 4:
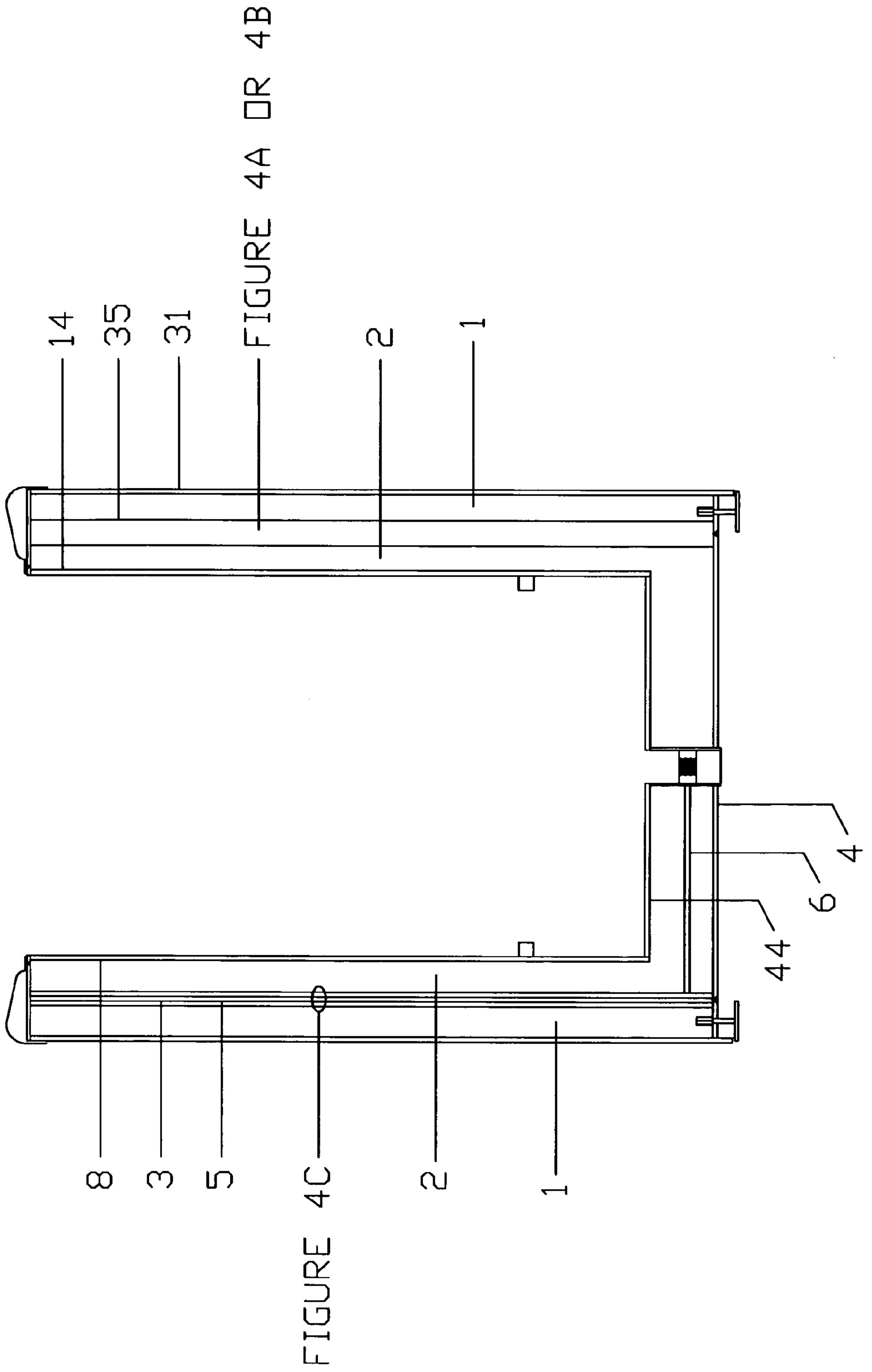
FIG. 4*a* shows an alternate embodiment of the center wall where the center wall is corrugated.
FIG. 4*b* shows an alternate embodiment of the corrugated center wall shown in FIG. 4*a*.
FIG. 4*c* shows an alternate embodiment of the center wall where it is coiled around itself.
FIG. 4*d* shows an alternate embodiment of the center wall where it is perforated.
Figure 4B:
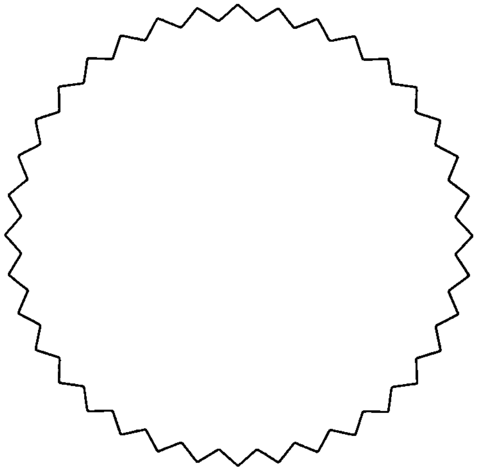
Figure 4D:
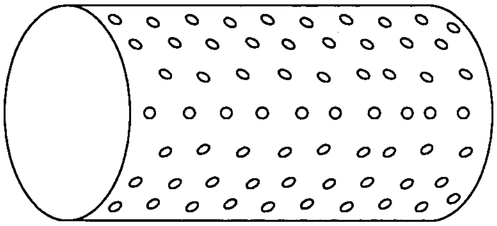
Figure 4A:
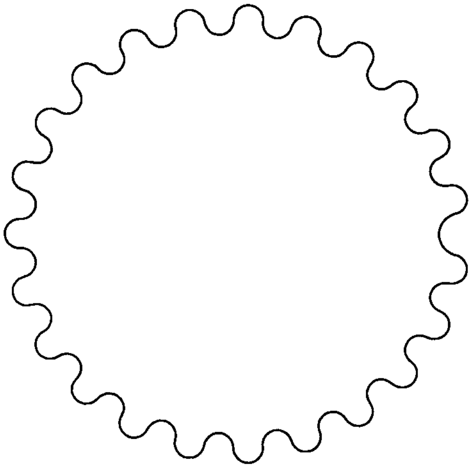
Figure 4C:
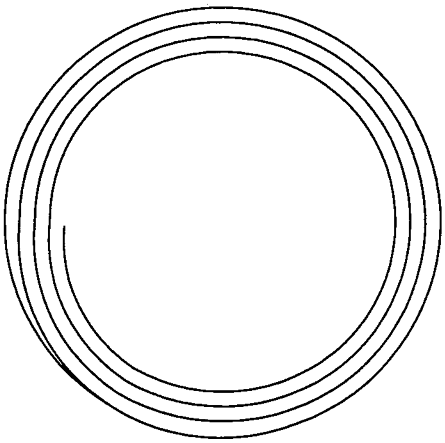

Between this inner shell 8 and the center shell 3 is a second layer 2 of compression material which can be the same or can be different for reasons which will be discussed in more detail below. Each shell (inner, middle, or outer) may also have multiple layers of steel or material of comparable strength or other blast absorbing material layers as shown in FIG. 4*c* below.

Figure 3:
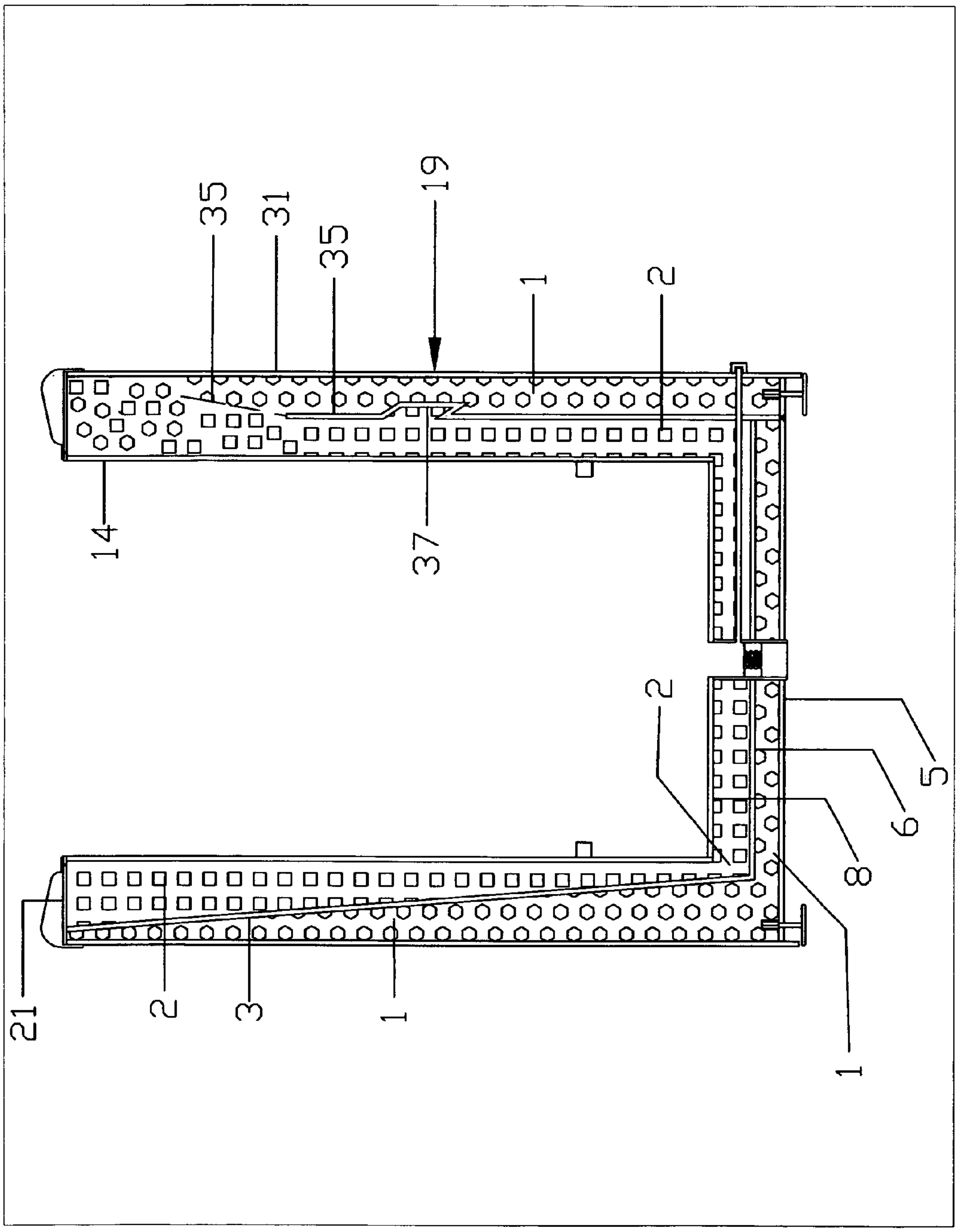
FIG. 3 shows a second alternate embodiment of FIG. 1.

It could be important to provide for different levels of compression from one layer of material to another, as shown in FIG. 3, by having circles indicating one type of material for the inner layer of material and squares for the outer layer of material. This provides that one may compress from the initial explosion and the second may not compress or may not compress as far by virtue of the faster compression of the first layer. The phase (solid, liquid—e.g. water, gas) may also change from layer to layer. While two layers are shown, there may be more than two layers using the methods taught for this embodiment.

The layers may be the same and may be poured together by cutting out or not welding the bottom before pouring the layers. While the top of the center wall is shown joined to the top of the can in FIG. 1, FIG. 3 shows how the top may end before reaching the top of the can to provide a compression layer between the top of at least one metal wall (here the center wall) and the top of the can.

Nylon guides 7 screwed into pegs 7*a* allow the can to be leveled by screwing the guides in or out of the pegs 7*a* as shown in FIG. 1.

Figure 2:
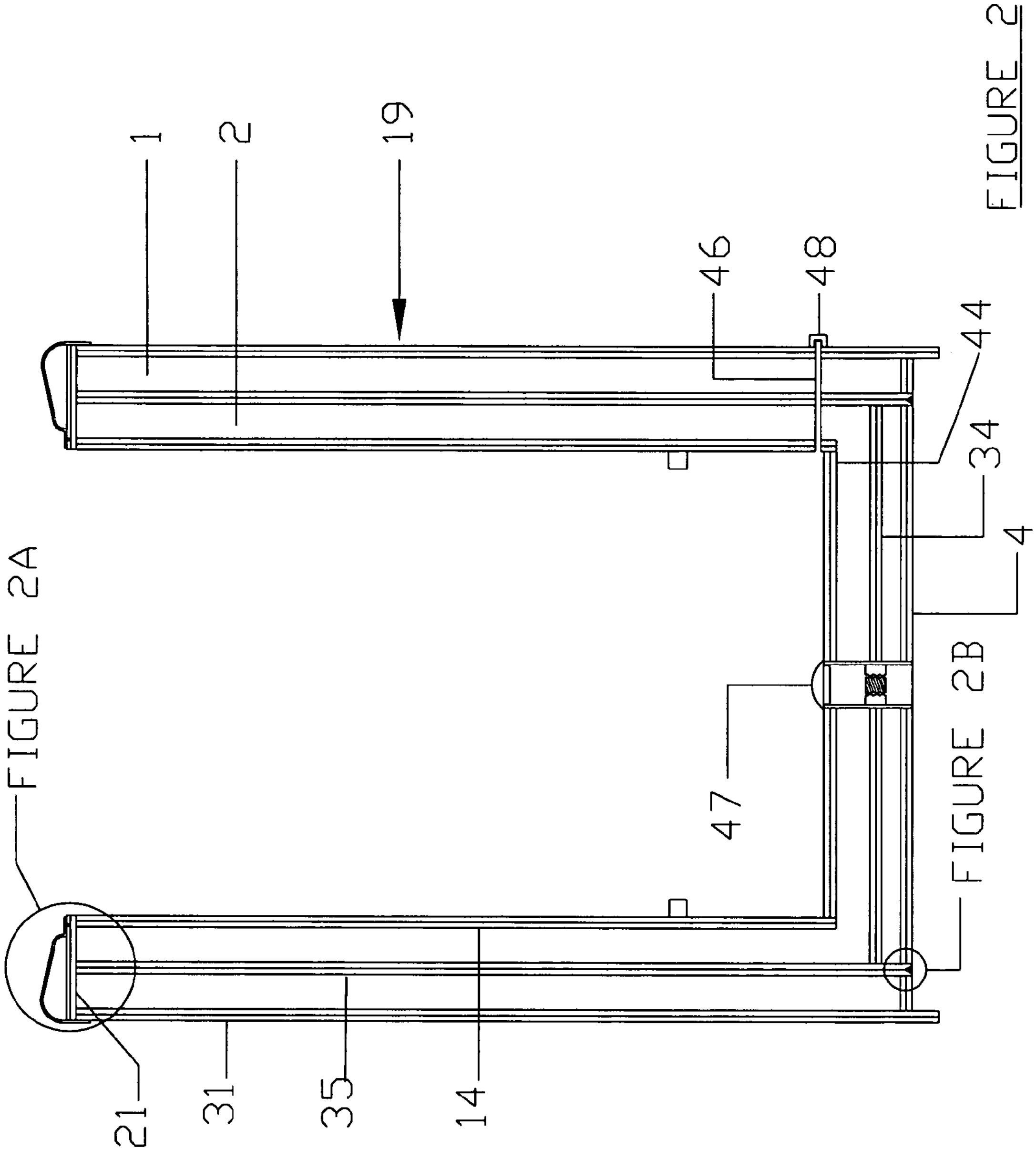
FIG. 2 shows an alternate embodiment of the version shown in FIG. 1.
Figure 2A:
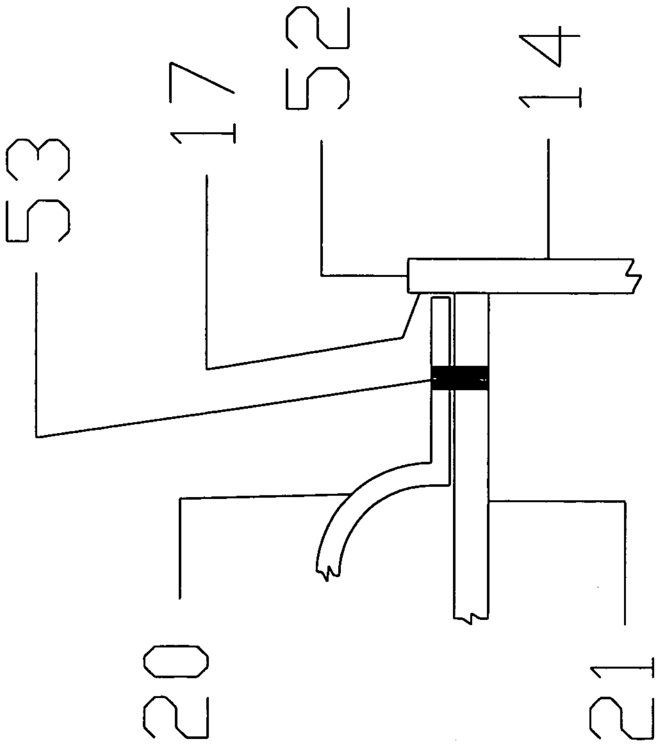
FIG. 2*a* shows a detail view of the glass diverting lip defined by the inner wall and the cap.
Figure 2B:
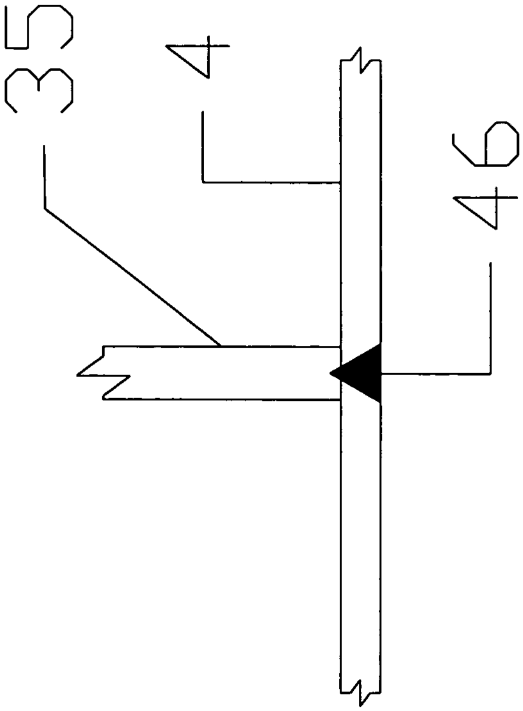
FIG. 2*b* is a detail view of the blast diverting welds where the middle wall is connected to the face.

FIG. 2*b* is a detail view of the blast diverting welds where the middle wall is connected to the face. The welds 46 seal the vertical middle wall the vertical to the bottom 4.

The top of the center wall may be blunt as shown in FIG. 3 so that it tends to compress into the compression material and not go through the compression material.

The inner wall way be reinforced by a flexing bar 40 in a dampening support 41 welded to the outer wall (or in other embodiments to the center wall). In this figure, the center wall is also supported by at least one non-flexing bar 42 which is received within dampening support 43. These would be designed to collapse so as not to become projectiles in the event of an explosion. This could be accomplished by having the bars 40 and 42 made of material softer than the outer walls, center walls and/or dampening supports 41 and 43.

FIG. 3 also shows a change in the material within the layers 1 and 2 to provide different compression ratios in the different layers. To funnel the explosion upward, the compression materials may vary in thickness or compressibility as they move from the bottom of the container towards the top.

In FIG. 3, the center shell vertical wall 31*a* is angled or tapers outward on the left side from bottom to top on one side to provide thrust in that direction. Similarly, the material compressibility may angle as shown in FIG. 3 at the intersection 85 of two different compression layers 1 and 2 to accomplish this type of result without varying the wall angle or without a center shell vertical wall. Preferably this involves a less compressible outer, second layer 2 on the right side 36 the vertical middle wall 35 is shaped at buckles 37 and tapers outward with shaped compression material mixed at the top 38 of middle wall 35. Yet another alternative is to have the wall buckled outward at one or more locations at buckles 37 with or without corrugation as shown in FIGS. 4*a* and 4*b*.

The bottom floors of the walls and the materials may similarly be varied in shape, to absorb or redirect the blast.

This allows for larger explosions where one layer compresses against the other thereby baffling the destructive force and providing superior funneling upward and catching of shrapnel.

As shown in FIGS. 1 and 5*a*-5*i*, there is a cap 20 which defines an opening to allow access to the center of the can there is a lip. The vertical inner wall 14 has an extension 17 which extension 17 separates the interior 22 from the cap lip 16 so that any blast is directed over the top of the cap lip 16 as can be seen in FIG. 6 by the extension 17. The cap 20 has an outer wall 18 which fits over the top of the outer shell 5.

There is an essentially flat lip 17 at the top of the vertical inner wall 14 which can receive an overhang 15 of an interior plastic liner 13. The liner 13 may also have a handle pull 49 to be grasped and turned and lifted out in a manner which will be described in more detail below.

The liner is preferably plastic with a plug 10 (FIG. 1) which can be removed which will allow drainage through drain 9 or through pipe 39 in the bottom of the garbage can 19.

Figure 7D:
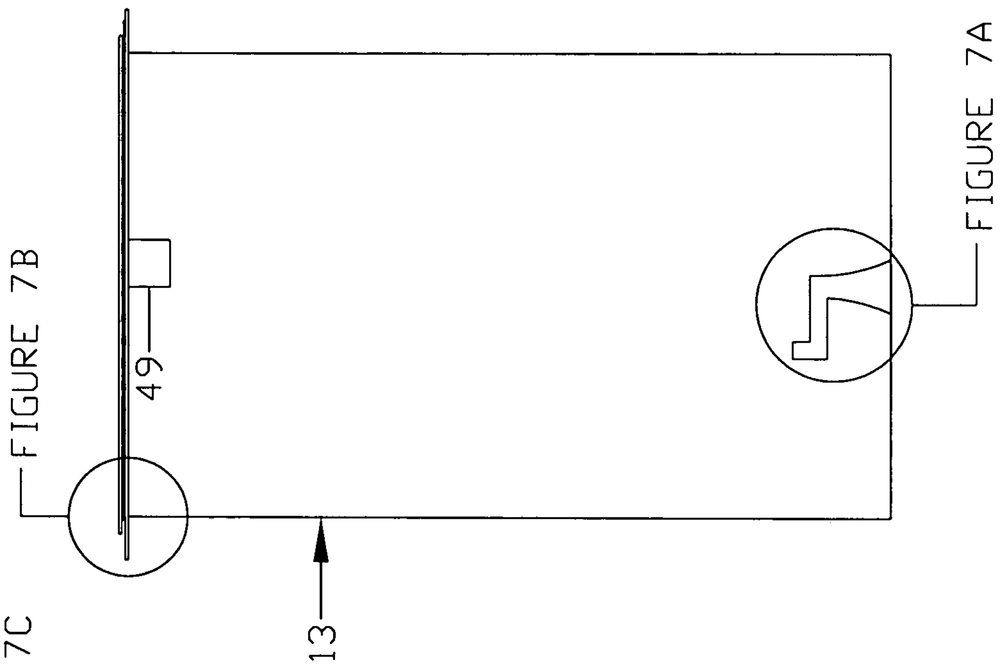
FIG. 7 shows the liner shown in FIG. 6*a* rotated 90 degrees to show the securing slot.
FIG. 7*a* shows a detail of the securing slot.
FIG. 7*b* shows a detail of the attachment of the lip of the can liner to the can altered to allow attachment of a spacer to allow smaller liners to be used with a larger can.
FIG. 7*c* shows the interaction of the lid and liner for holding garbage bags.
Figure 7:
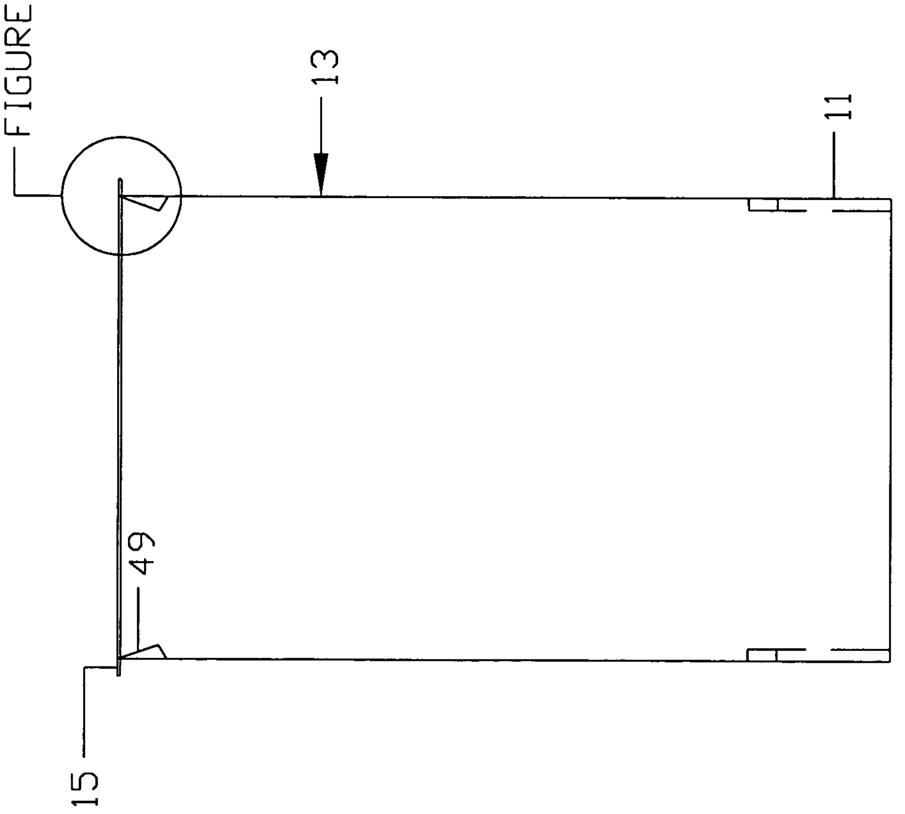
Figure 7B:
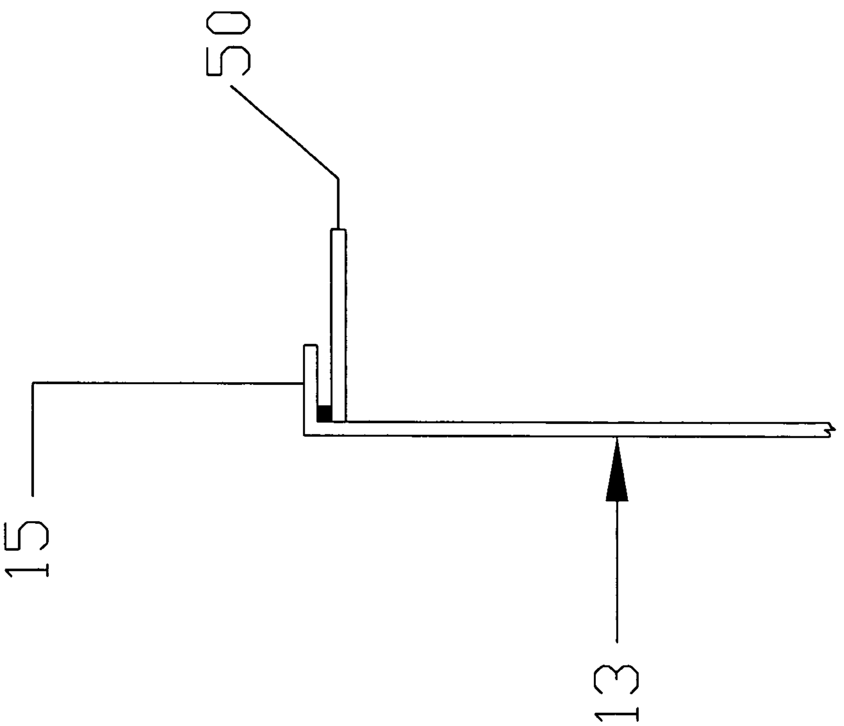
Figure 7A:
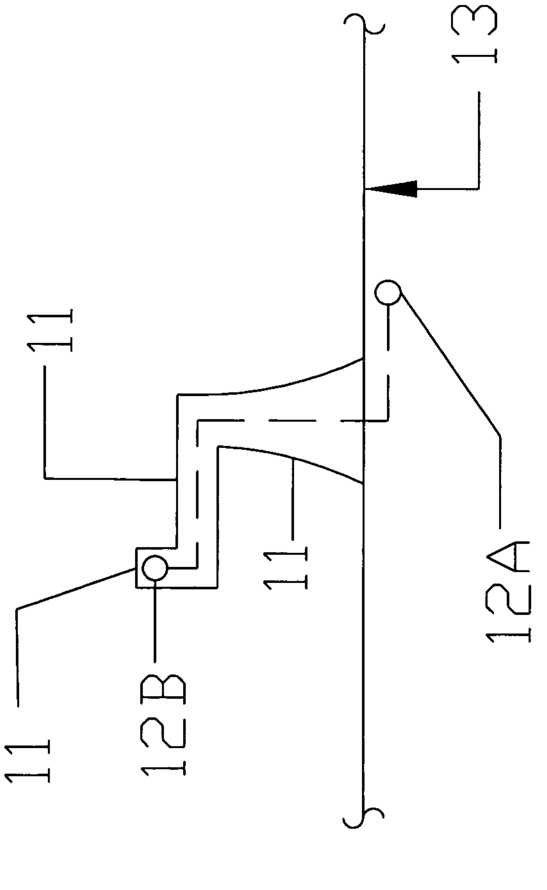

The plastic liner 13 defines a slot 11, shown in FIG. 7*a*, which can be engaged or released with peg 12 of the inner wall in order to have the plastic container held or locked in place within the garbage can. The slot 11 may be a reinforced insert attached to the bottom of the liner. The slot 11 has walls which slope to the center to direct the peg 12 from the liner raised position 12*a* to the liner lowered position 12*b* so that a bag 33 can be inserted while the liner 13 is raised and trapped between the overhang 15 and above the top of the can inner wall.

FIG. 2*a* shows an alternate drain 4 which drains the can interior above the drain 9 at approximately the level of the top of the inner base 44.

The lip 16 of the cap 20 when a cap is used and the overhang 15 of the liner 13 can hold the top of the bag 33 between them to keep the bag 33 in place. Where the liner 13 is light enough (preferably a plastic liner), without raising the liner 13 a single bag 33 can be removed which may leave one or more bags underneath the first bag and underneath the lip which is in place. This allows the loading of multiple bags at one time.

The plastic liner may be lifted and a garbage bag inserted over the lip and side of the overhang 15 so that when the plastic liner gets replaced, the garbage bag is locked in place.

Figures 5, 5A, 5B, 5C, 5D, 5E, 5F:
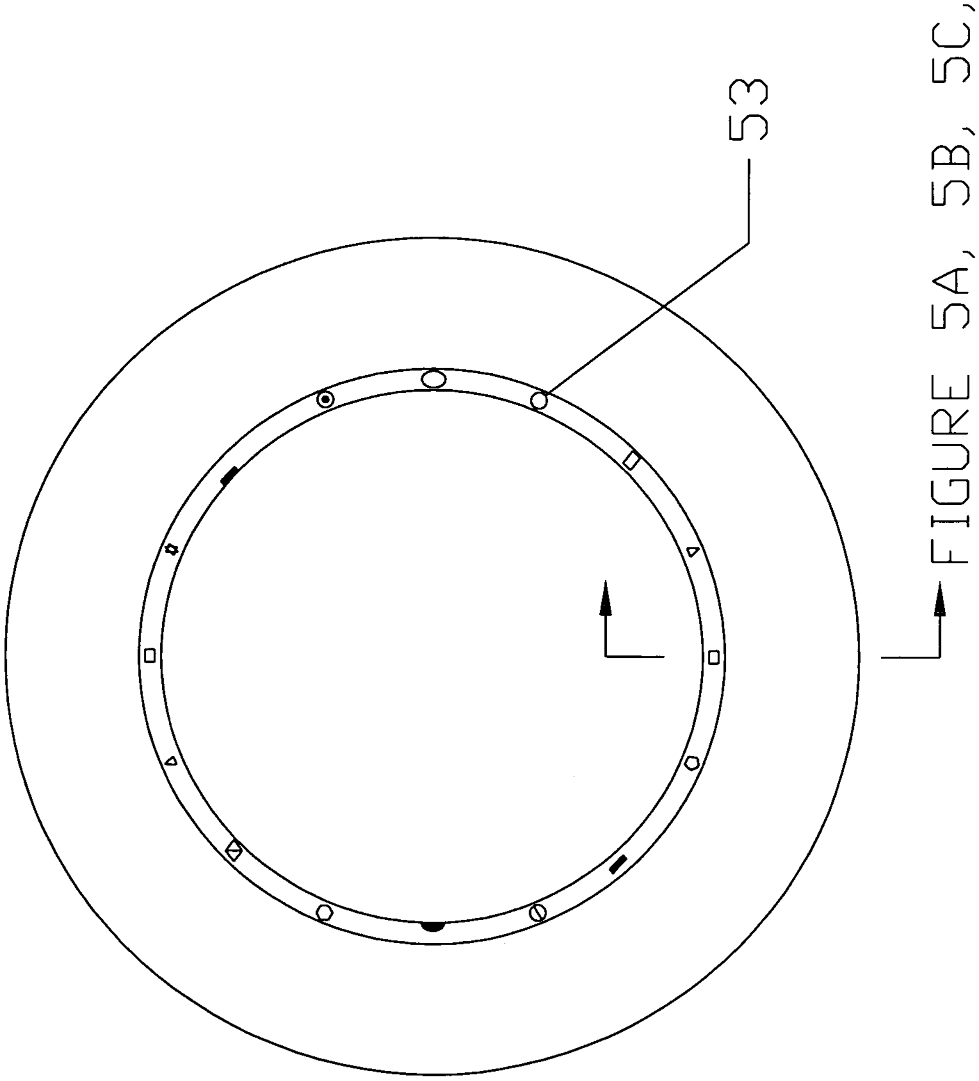
FIG. 5 shows a cap.
FIG. 5*a* shows one cap design.
FIG. 5*b* shows an alternate cap design.
FIG. 5*c* shows an alternate cap design.
FIG. 5*d* shows an alternate cap design.
FIG. 5*e* shows an alternate cap design.
FIG. 5*f* shows an alternate cap design.
Figure 5D:
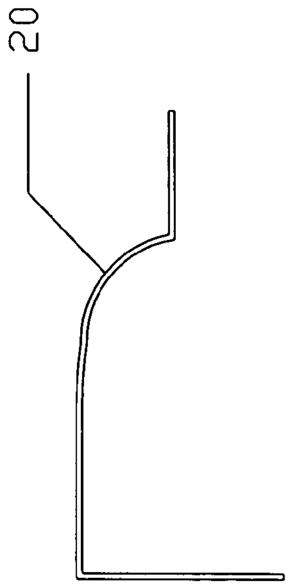
Figure 5E:
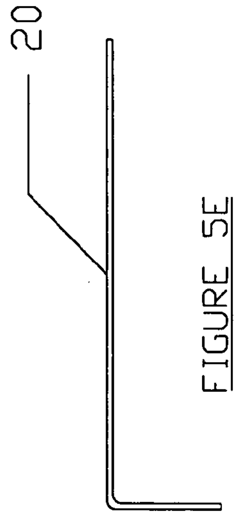
Figure 5F:
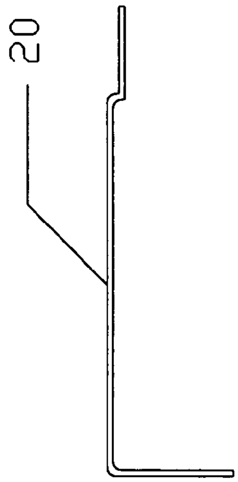
Figure 5A:
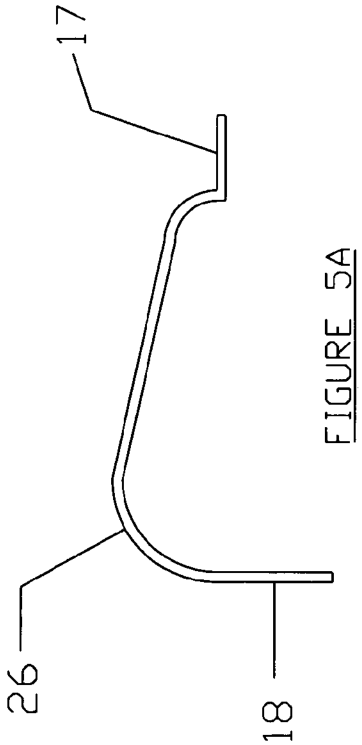
Figure 5B:
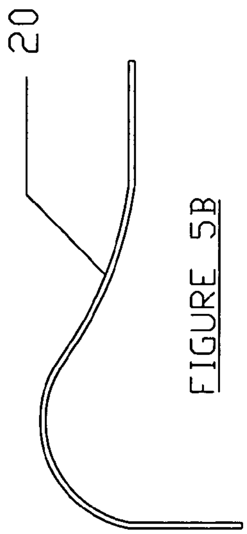
Figure 5C:
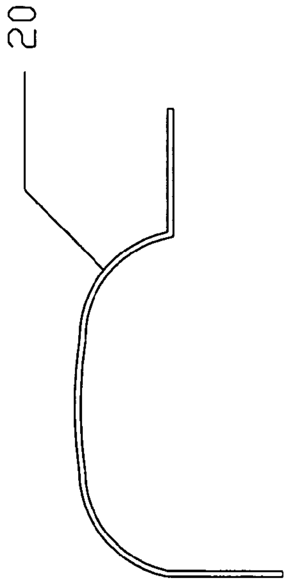
Figure 6:
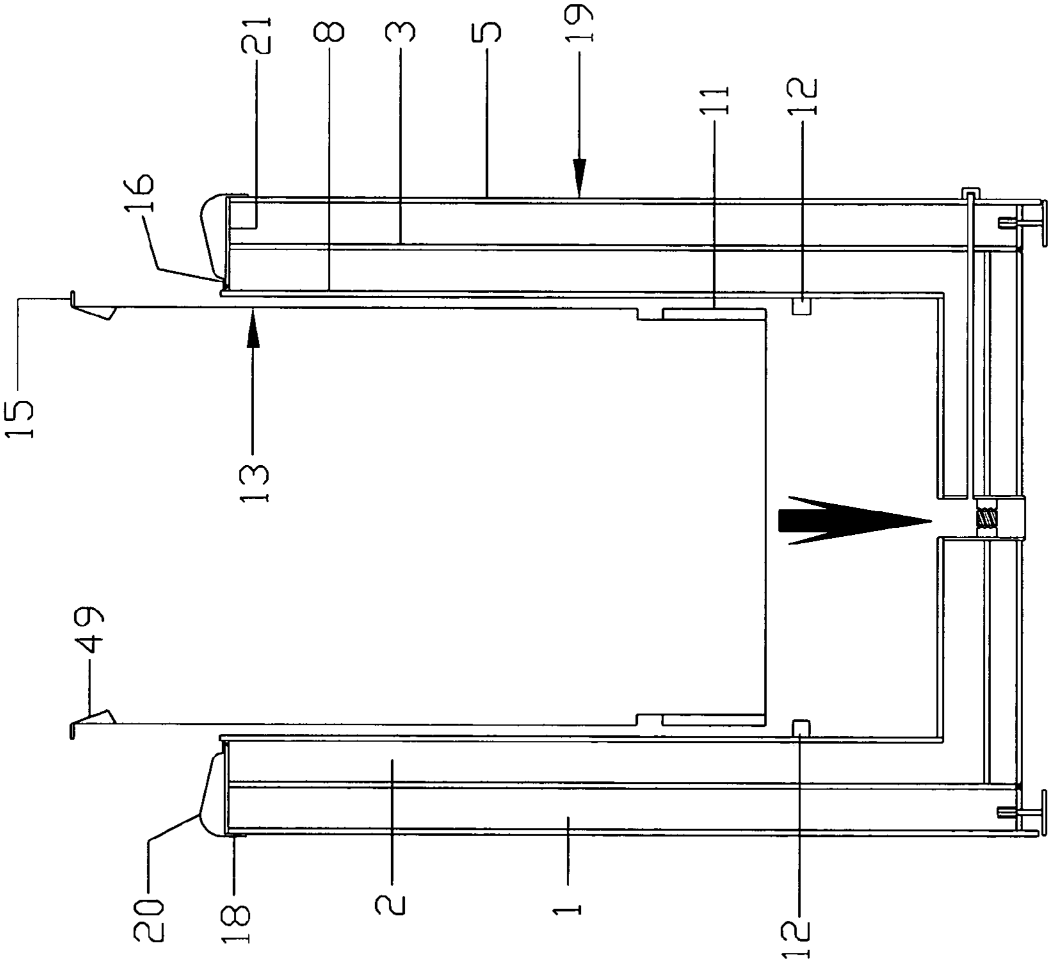
FIG. 6 shows the embodiment of FIG. 1 with the liner removed.

FIG. 5 shows a cap from the top. Attachment holes 53 are provided to attach the top to the can.

FIG. 6 shows the can with the plastic liner 13 raised.

FIGS. 7 and 7*d* show views, rotated 90 degrees of the liner shown in FIG. 6. There are handles 49 which allow the can to be lifted.

FIG. 7*b* shows a detail of the attachment of the lip of the can liner to the can altered to allow attachment of a spacer 50 to allow smaller liners to be used with a larger can. The lip 15 may be permanently attached to this spacer 50.

Figure 7C:
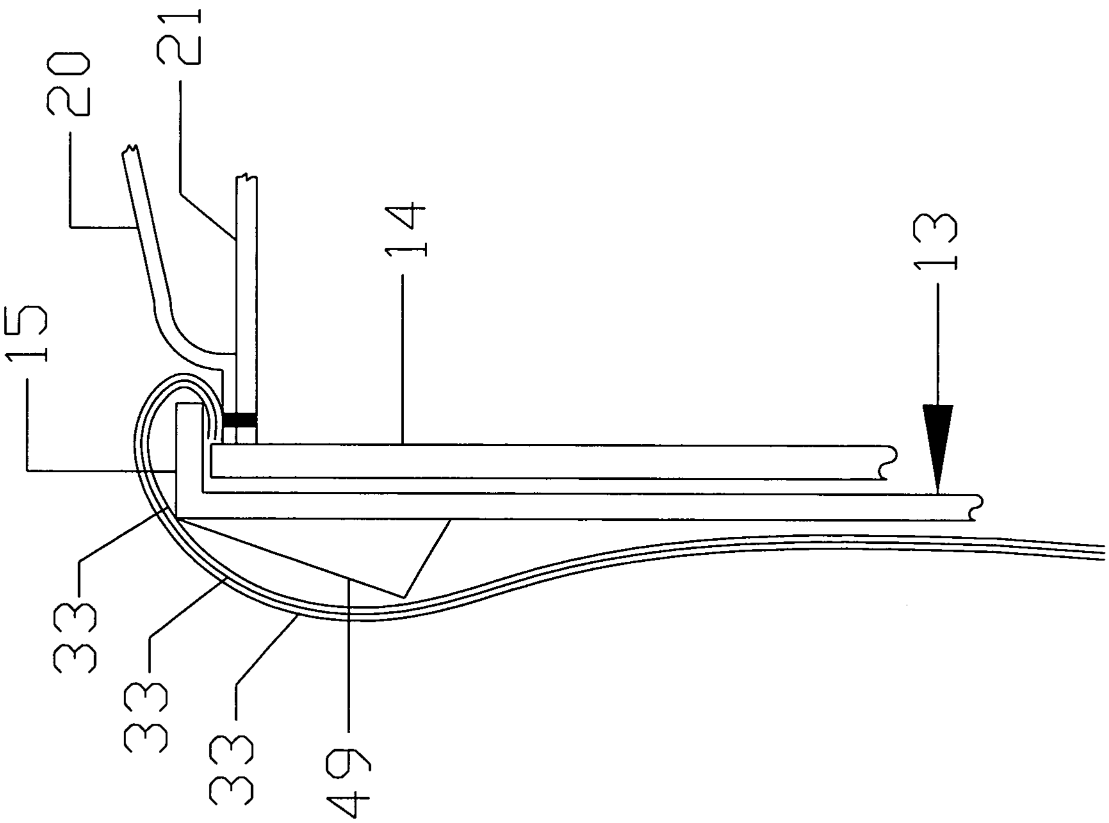

FIG. 7*c* shows the interaction of the lid and liner for holding garbage bags. Here the bags 33 are held between the liner lip 15 and the top of the vertical inner wall and the top of the cap 20.

Figure 8:
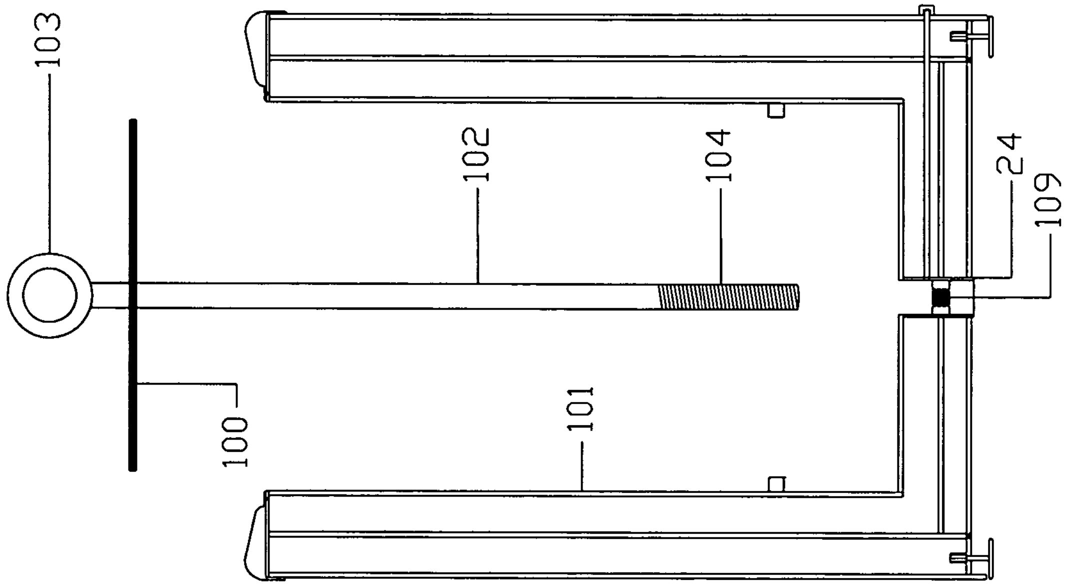
FIG. 8 shows a lifting means in conjunction with a can.
Figure 12:
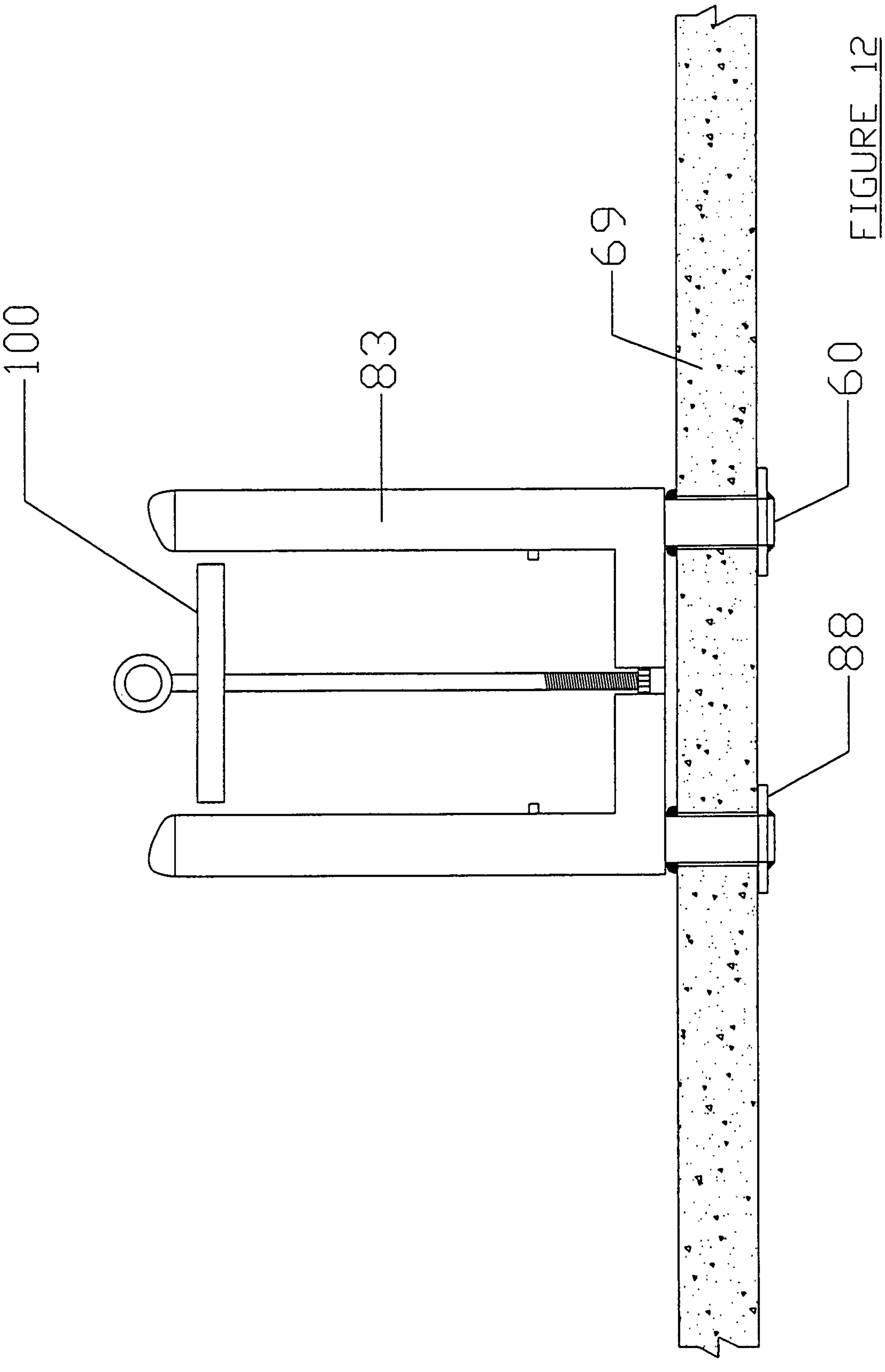
FIG. 12 shows the lifting means in place and a hand secured by bolts passing below the surface to which the can is secured which is secured by nuts below that surface.

As can best be seen by reference to FIGS. 8 and 12, there is a stabilizing ring 100, which has approximately the same perimeter shape and size as the internal perimeter 101 of the can. This ring is mounted on a rod 102 which has a ring 103 (which may be replaced with a hook or threaded bolt, etc.) at the top and is threaded with threads 104 or other attachment mechanisms such as an interlocking channel at the bottom which may be received by threaded nut 109 in the bottom.

FIGS. 12, 13, 14 and 16 show an alternate can 83 having a solid cross section with the lifting means described in the preceding paragraph and alternate securing means for holding the can to the ground. This cross section may be obtained by replacing the inner wall with materials providing the same effect as described above in reference to the intersection 85 of different material layers 1 and 2. While two layers are described, it is obvious from this description that multiple layers (as would be possible with a spiral design as shown in FIG. 4*c* for the middle shell) of compression material may be utilized.

This ring 103 may be offset or moveable to achieve an offset in order to allow for easy lifting when attached to the bottom of the can by attaching a lifting means such as a crane or the like to the top ring 103.

Figure 9:
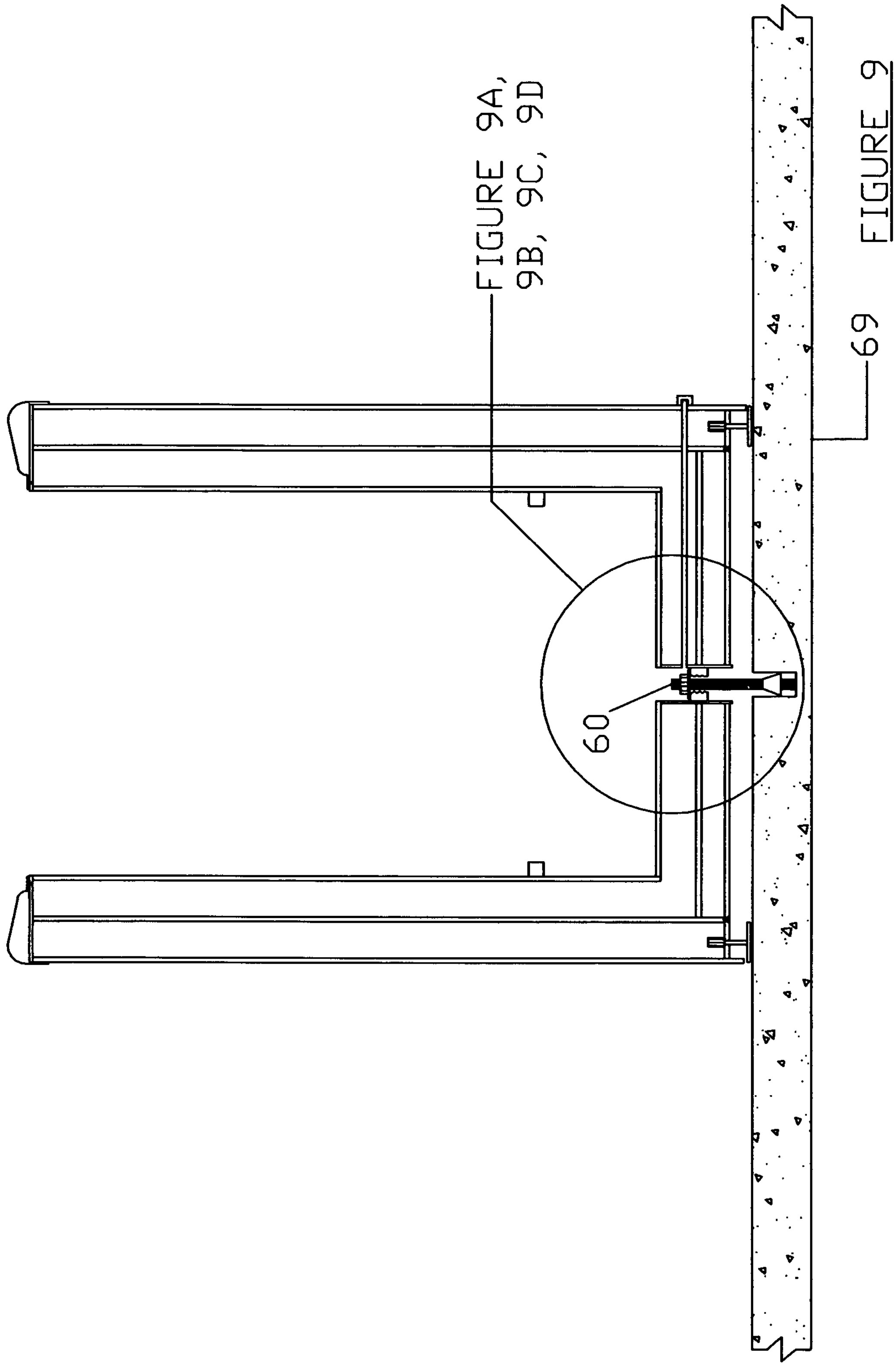
FIG. 9 shows a securing means for use with the embodiment shown in FIG. 8.
Figure 9A:
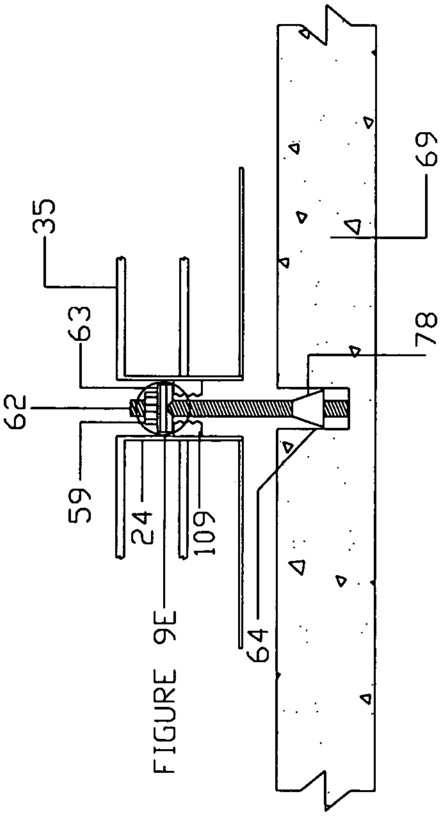
FIG. 9*a* shows a first alternate securing means.
Figure 9B:
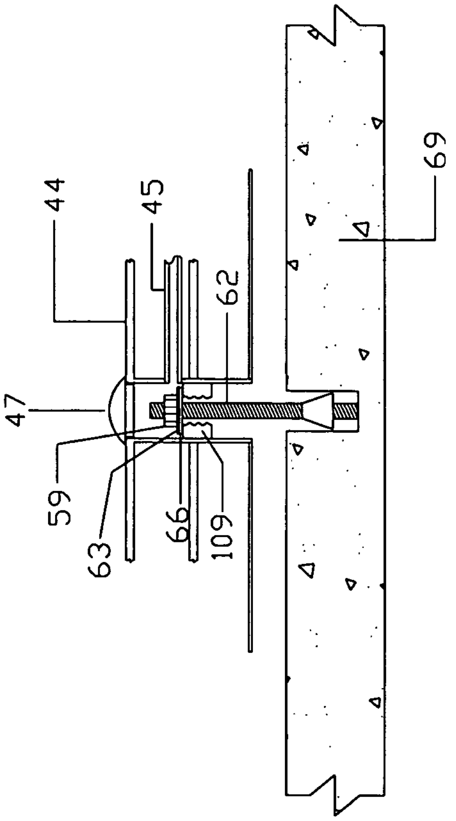
FIG. 9*b* shows a second alternate securing means.
Figure 9C:
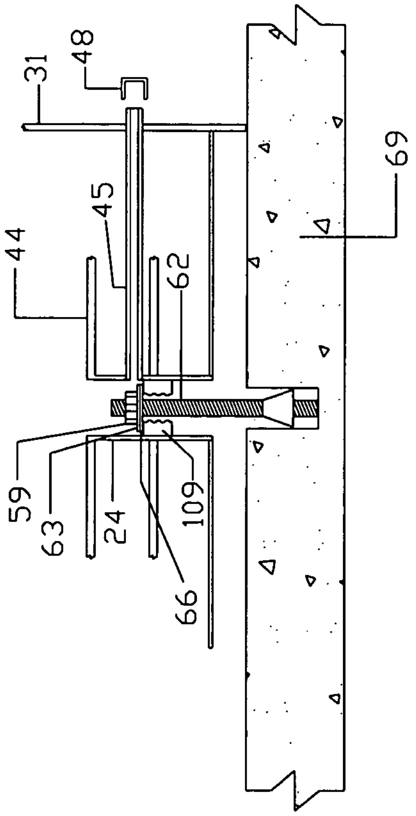
FIG. 9*c* shows a third alternate securing means.
Figure 9D:
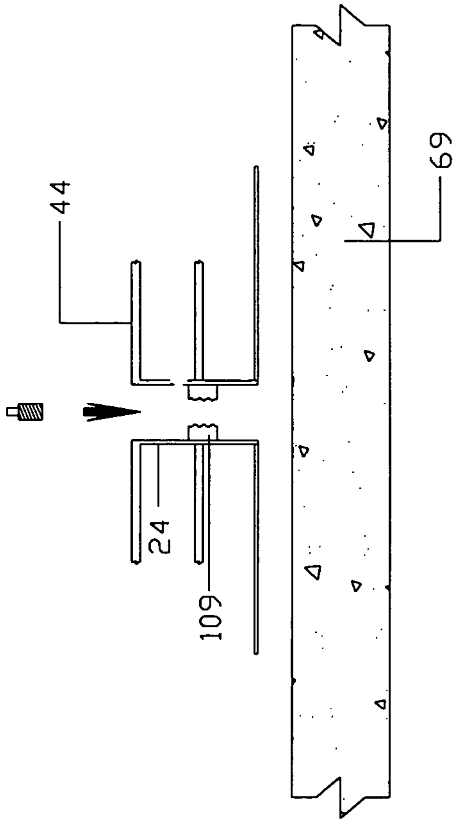
FIG. 9*d* shows a plug which may be utilized in addition to or in the alternative having a securing means.
Figure 9E:
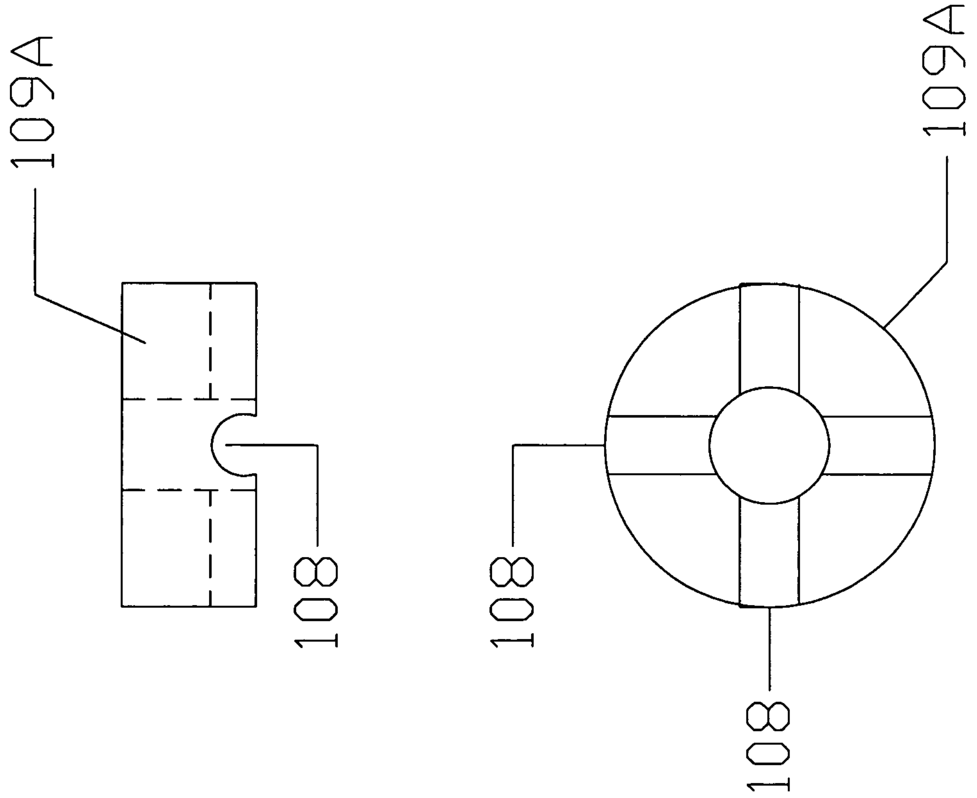
FIG. 9*e* shows a top view of a specialized washer.

At the bottom as shown in FIG. 9, one or more pile means here piling 60 which may be a threaded (or may be a concrete pile or a metal pile or a pile of any other suitable material which may be set in the ground or removably set in the ground) through the nut 109 attached to the bottom of the can. In this embodiment, the opening in the nut 109 is larger than the piling 60 so that the piling 60 passes through the nut 109 and is fastened by a nut 59 above a washer 59 which hold the can to the ground, here concrete layer 69, over nut 109. The rod 102 may be hollow so it may fit over the bolt 60.

While a single threaded piling 60 in the center is shown here it can be seen within the disclosure set forth herein that multiple drains 9 having threaded nuts 109 may be utilized in order to have either multiple rods 102 or in order to have multiple removable pilings 60 to which the can is attached to the ground as shown in FIGS. 10, 10*a* (single piling), 10*b* (double piling), 10*c* (triple piling), and 10*d* (quadruple).

FIG. 9 shows where the top nut 109 attaches to pilings 60, washers 59 may be used in order to plug side drains and prevent drainage to the bottom (which may also be prevented by drain plug 47). FIGS. 9*a*-9*d* show the use of different washer elements to accomplish this result.

The drains may be stoppered with plug 47 and may slant upward or downward in order to allow or prevent drainage when the plug 47 is removed and the plug 47 may be on the inside or the cap 48 may be used on the outside according to the determination of the user.

The use of different washers is shown in several embodiments in FIGS. 9*a*-9*d*. As shown in FIG. 9, one method of using this would be to have a top side drain 45 which is at or near the inner base 44 and drains to the side. If the bottom plug washer 59*a* is removed, the opening 51 is unplugged. The plug may be in the form of a washer 63 over the top 66 of nut 109 which fits over piling 60 allowing the nut 59 to hold it in place against nut 109.

This side drain allows for the permanent bottom drain 9 to be sealed or drain. The combinations provides a means for draining to the side, bottom or not draining at all at the election of the user.

In FIG. 10, it can be seen that in order to increase the strength of connection with the ground, a full length reinforcing pipe 82 may be welded from the top 21 to the bottom 4 and along a shell, here the length of the center shell 3, vertical inner wall 14 and at the inner base 44 of the center shell 3. The pipe center 81 may be filled with asphalt, concrete or other dampening material to strengthen the overall project. The pipe 82 is here continuous with the piling 60 so the piling 60 is a continuation of the pipe 82 below the bottom 4.

Figure 13:
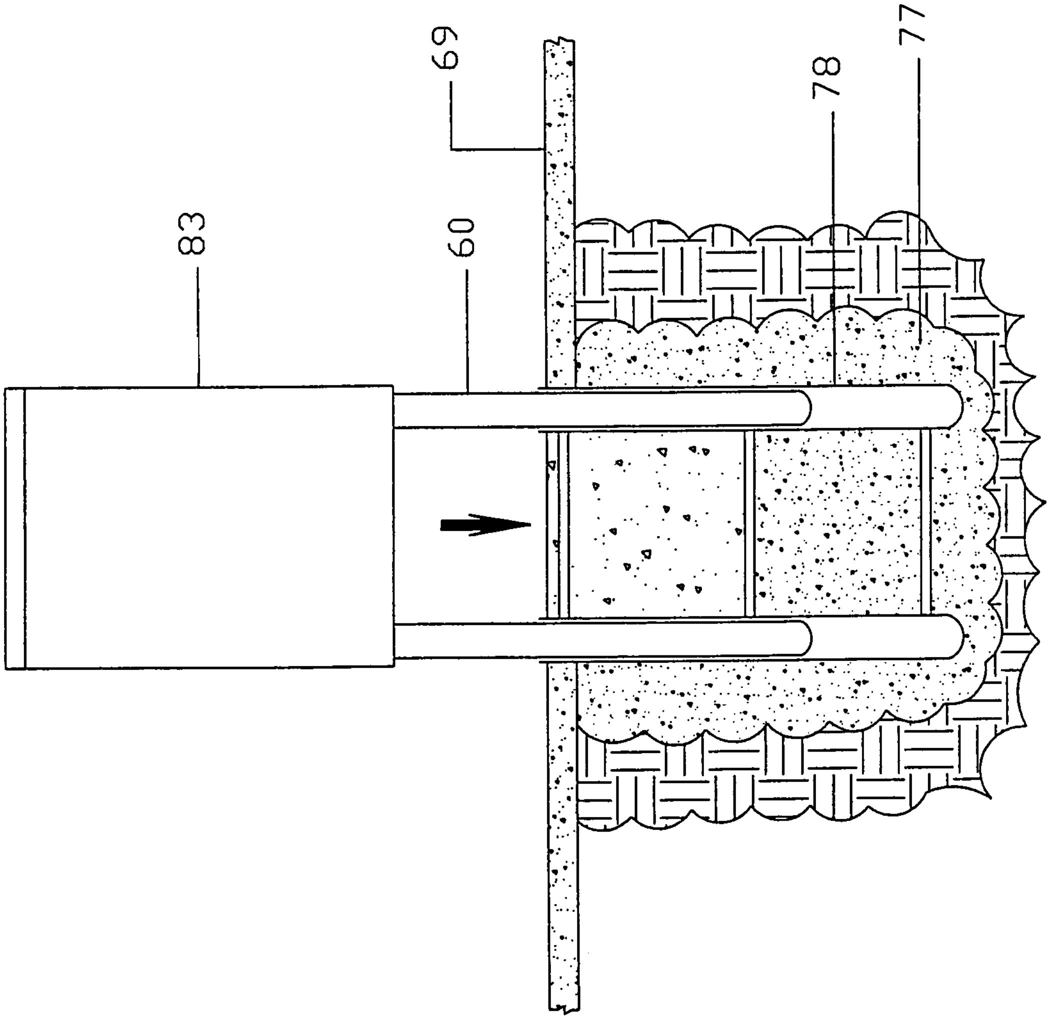
FIG. 13 shows the use of posts in a concrete matrix.
Figure 14:
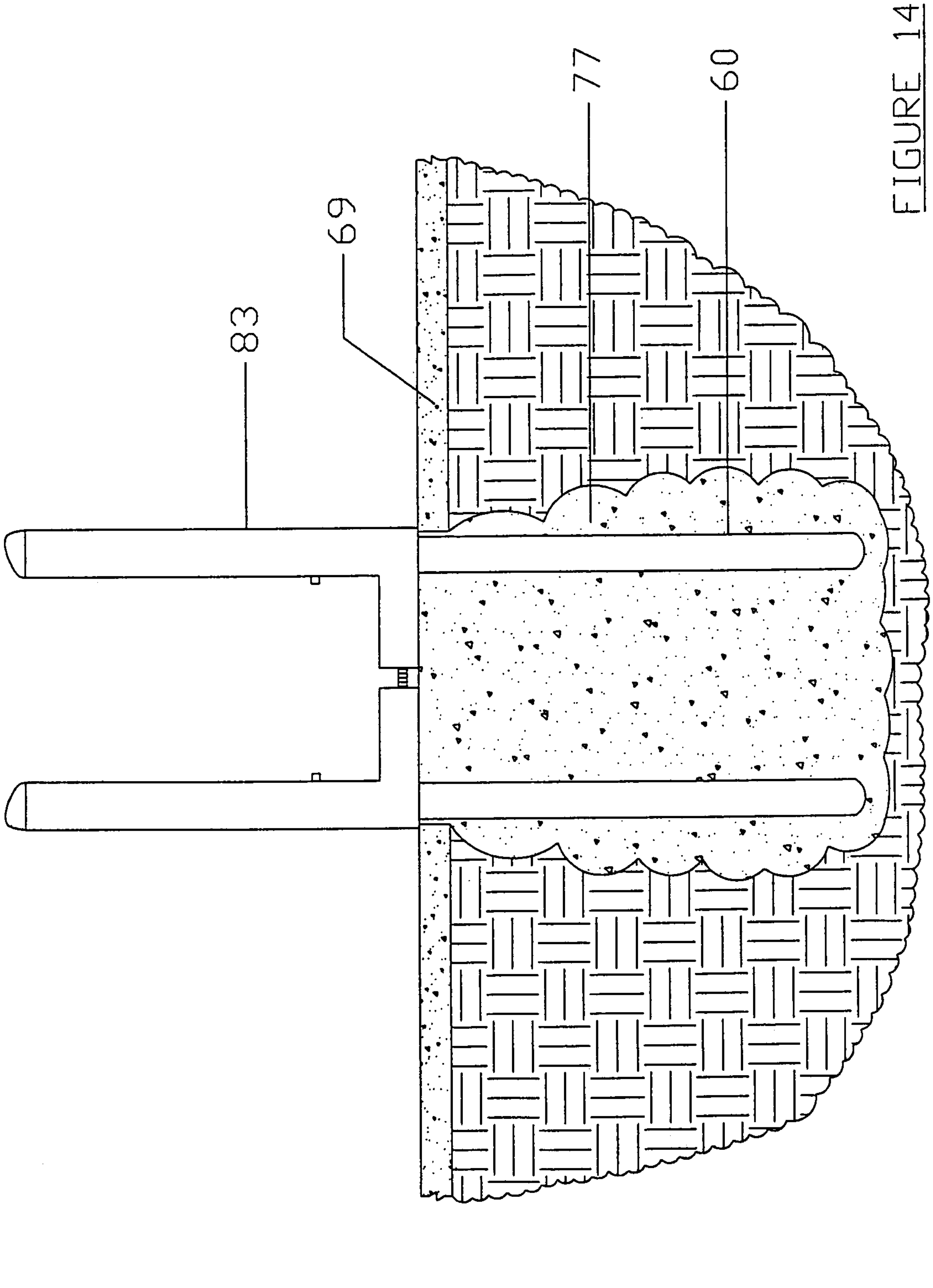
FIG. 14 shows the use of posts cemented in place.

In the embodiment of FIG. 13, the piling 60 runs below the bottom 4 of the can into a sleeve 78 in concrete or other material forming an opening to receive the piling 60. This sleeve 78 fits into a concrete pour 77 and may be secured thereto by retaining pins 79. When the can is lifted, not only the can is lifted, but the piling 60 is also lifted. Similarly, the sleeve 78 may be a portion of the concrete pour 77 in other embodiments.

Figure 15:
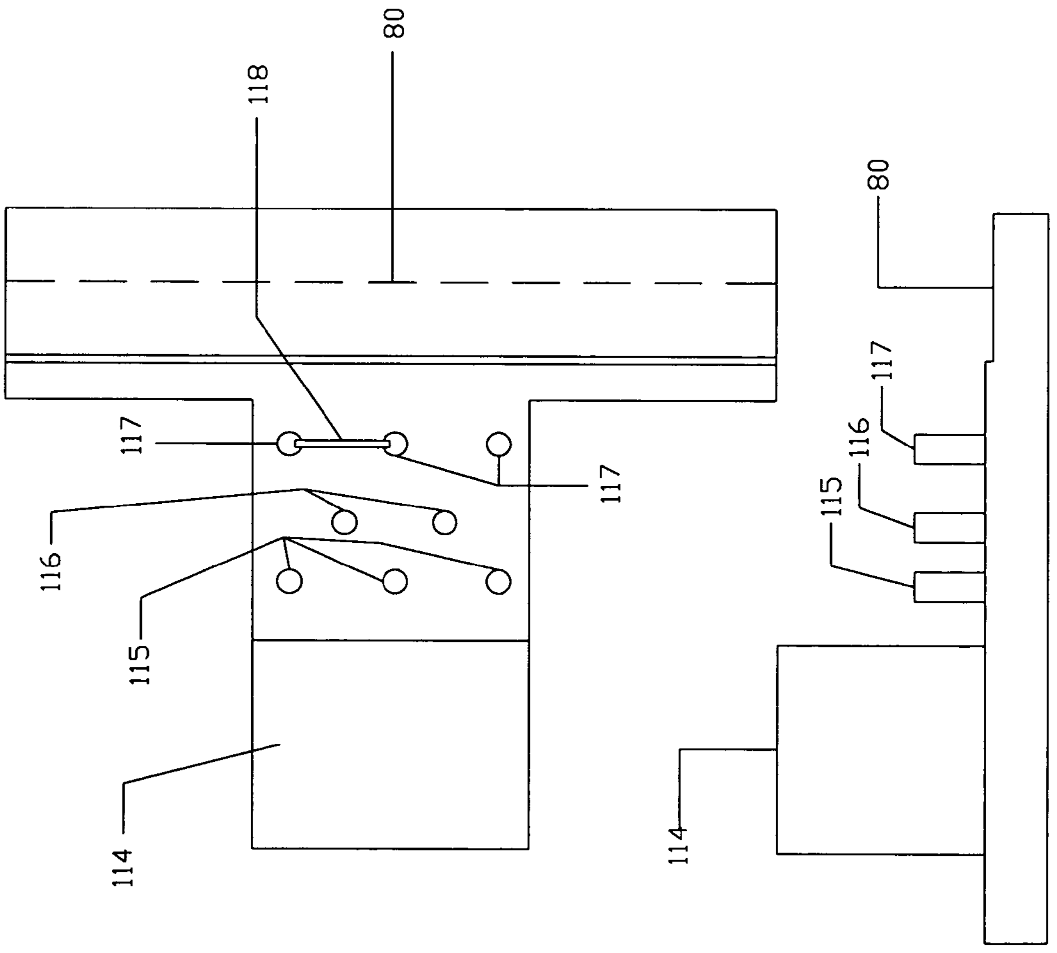
FIG. 15 shows the placement of the cans as a barrier.

FIGS. 15 and 15*a* show one embodiment of the invention where there are a plurality of spaced cans used as a barrier. These may be in one or more lines of cans. At least a part of the containment vessel may be made of a material such as steel or steel with concrete or concrete in order to provide a crash barrier as well as a garbage receptacle.

Because of the removable nature of the screw fittings, these barriers may be easily picked up for cleaning and exchanged if damaged.

Figure 11A:
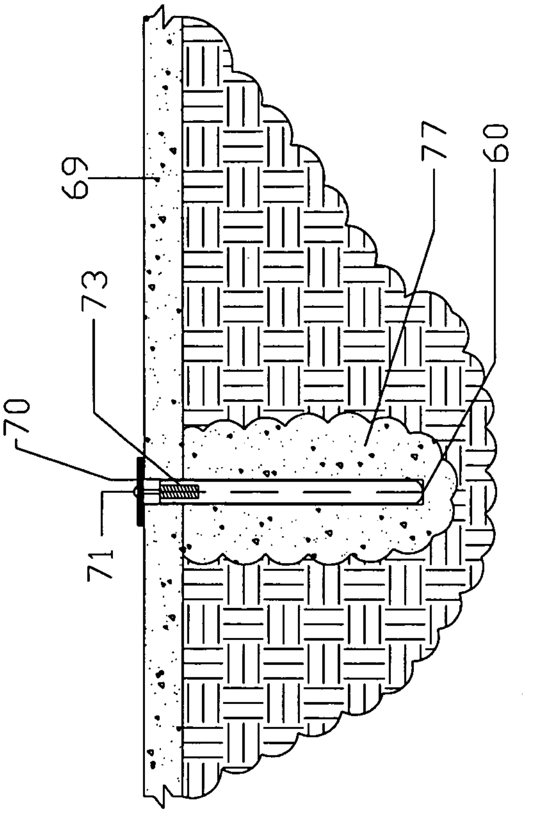
FIG. 11*a* shows a cap used in place of a securing post.
Figure 11:
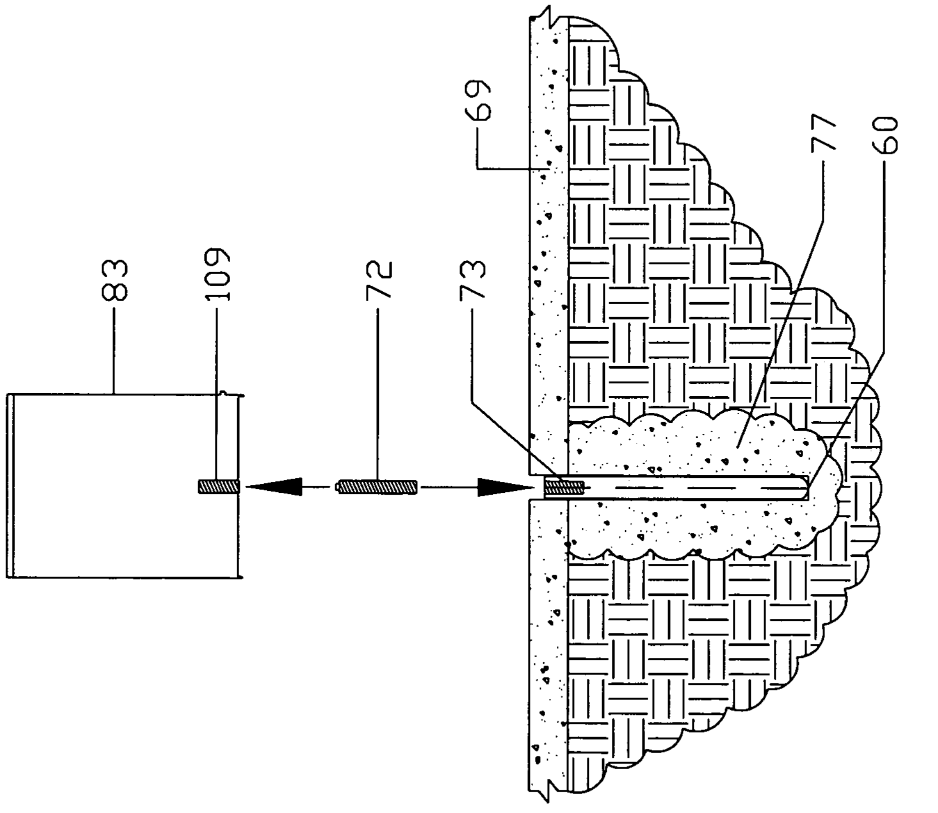
FIG. 11 shows an alternate to a post utilizing a bolt in place of the post.

In one embodiment of the invention, shown in FIGS. 15 and 15*a*, there are a plurality of properly spaced can locations (connected by beams 118 which may be bolted with bolts 111 to cans) to protect roads or a structure (building 114). In this embodiment, the cans are attached with bolts 72 running into boots 73 in the ground. The bolt 72 may be removed from the boot 73 (shown in FIG. 11) and replaced (FIG. 11*a*) with a cap 70 with a cap bolt 71 screwed into the boot 73 in such an embodiment. So that the ground is not uneven or less uneven depending on the shape of the cap 70 when the cans are removed. In this way, the cans can be removed to allow access to a road 80 by removing the blocking cans. Rows made up of cans 19 can be removed or added to provide greater protection.

Figure 16:
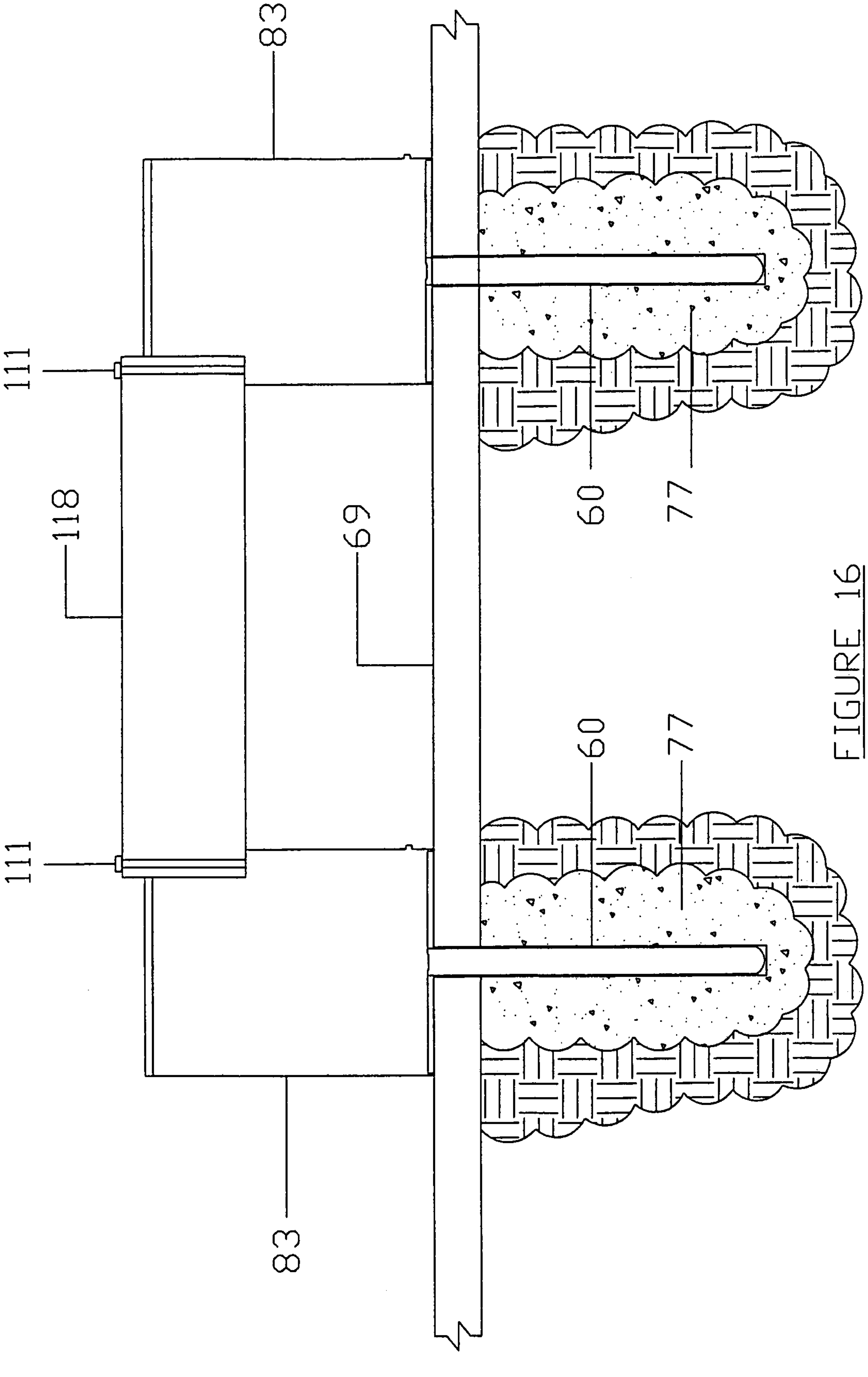
FIG. 16 shows the use of post cans with a brace running between two cans in order to form a barrier.

Additionally, as shown in FIG. 16, a fence of beams 118 can be attachment with bolts across the cans 19 so that a fence of beams 118 can be added to provide further protection where heightened security is required or where additional barriers are seasonally required across or along side of a road. In this way, barriers may be quickly erected and when not required, only garbage cans or plugs in the ground are required. At least a part of the containment vessel is made of a material such as steel or steel mixed with concrete or concrete in order to provide a crash barrier as well as a garbage receptacle.

This shows the garbage can unit used in conjunction with a railing (here beam 118) which may slant downward for use on steps.

If the can is rolled, there may be, at the point where the two ends are connected a backing strap 200 in addition to the welding. To further strengthen the can, the center shell seam 202 (if there is one) would be opposite or offset from the outer shell seam 201 (See FIG. 23).

A pipe is attached to the drain to get outside of the outer wall which can provide support (here drain 45). One or more braces (such as flexing bar 40) keep the can layers aligned and provide structure and are shaped to collapse to absorb an explosion.

In these embodiments, in order to prevent removal except where authorized, a locking means may be utilized in order to prevent the removal of the liner which is between the bolts holding the piling to the garbage can and the top opening where the bolts are accessed.

In these embodiments, it might be desirable to have a stronger liner made out of steel or a very strong plastic.

Because of the removable nature of the screw fittings, these barriers may be easily picked up for cleaning and exchanged if damaged.

To prevent the loosening of the lid in the event of a catastrophic explosion, the lip cap 16 may also be strapped down with a strap 53 to a plate 57 running around the circumference of the can from the inner wall 14 outward as shown in FIG. 2*a*.

Figure 17A:
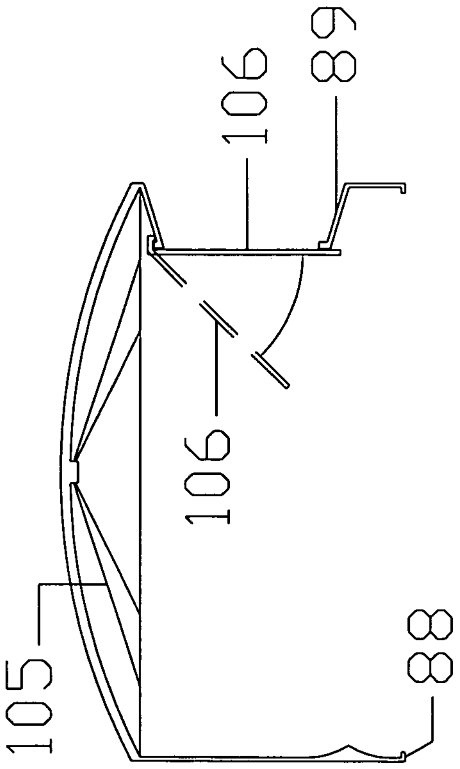
FIG. 17*a* shows a cross section view of the cap shown in FIG. 17.
Figure 17:
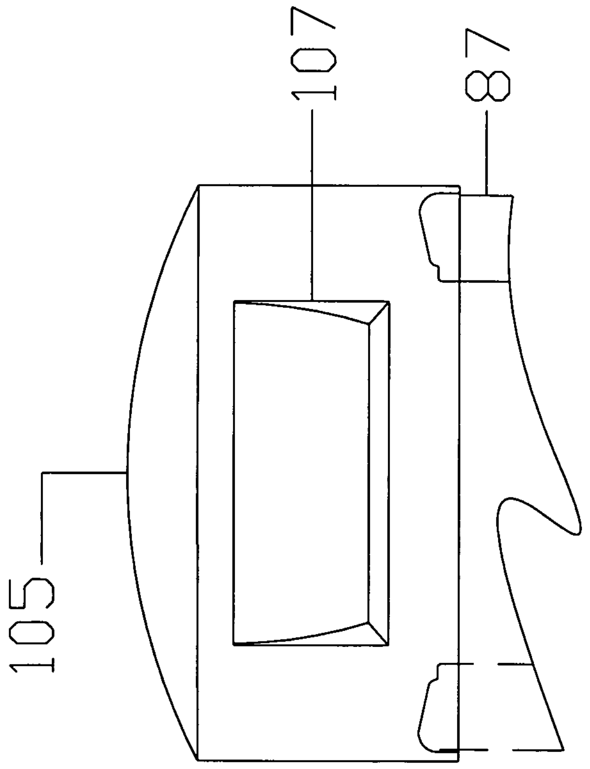
FIG. 17 shows a cap used to cover a can interior.
Figure 18A:
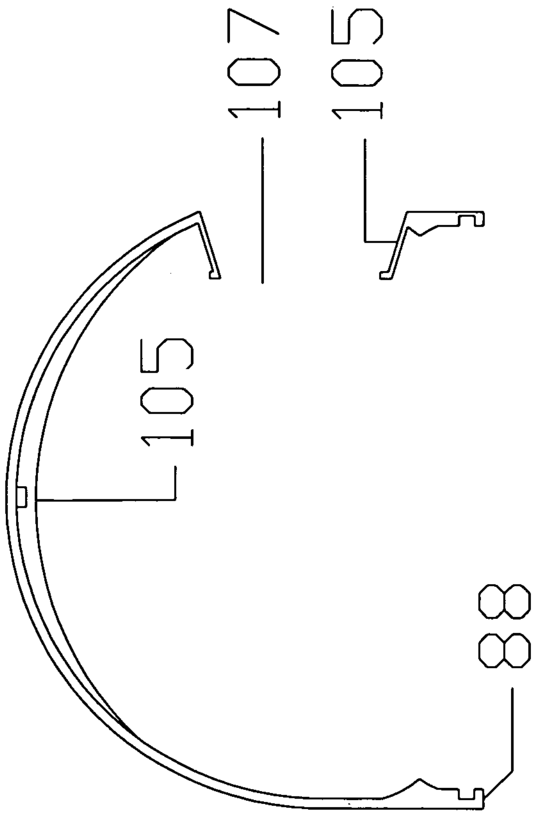
FIG. 18*a* shows a cross section of the embodiment shown in FIG. 18.
Figure 18:
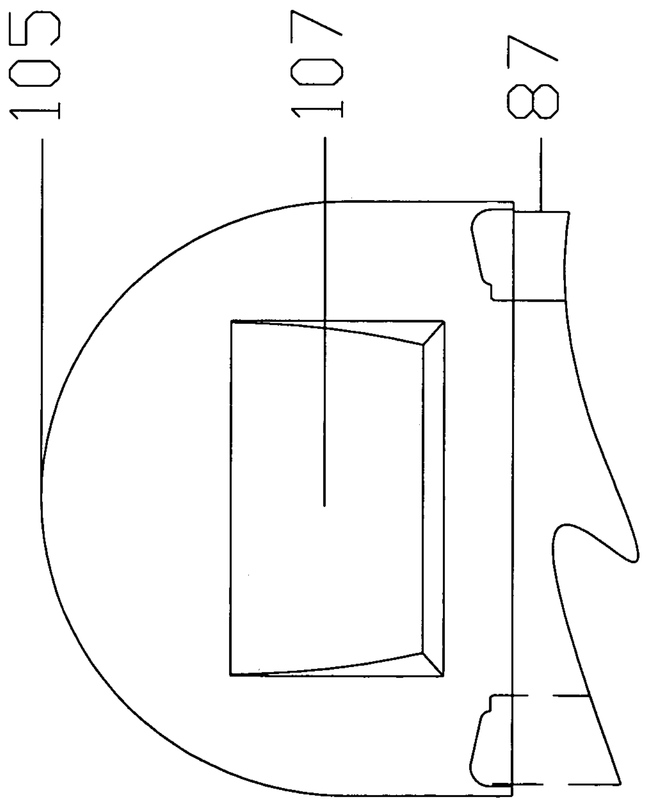
FIG. 18 shows an alternate embodiment of the cap.
Figure 19A:
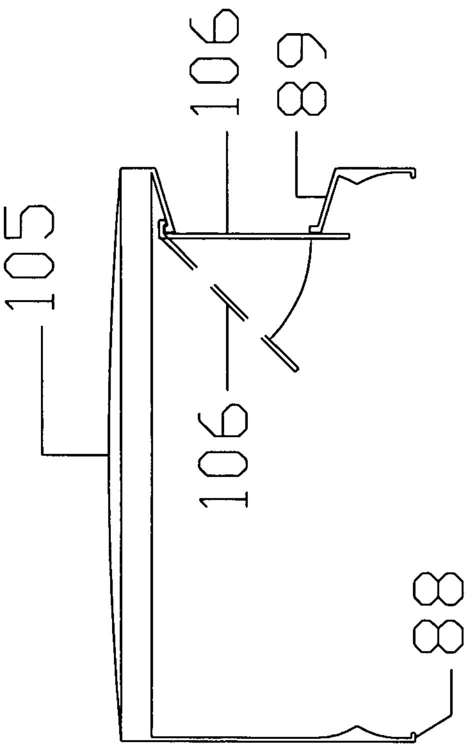
FIG. 19*a* shows a cross section of the embodiment shown in FIG. 18.
Figure 19:
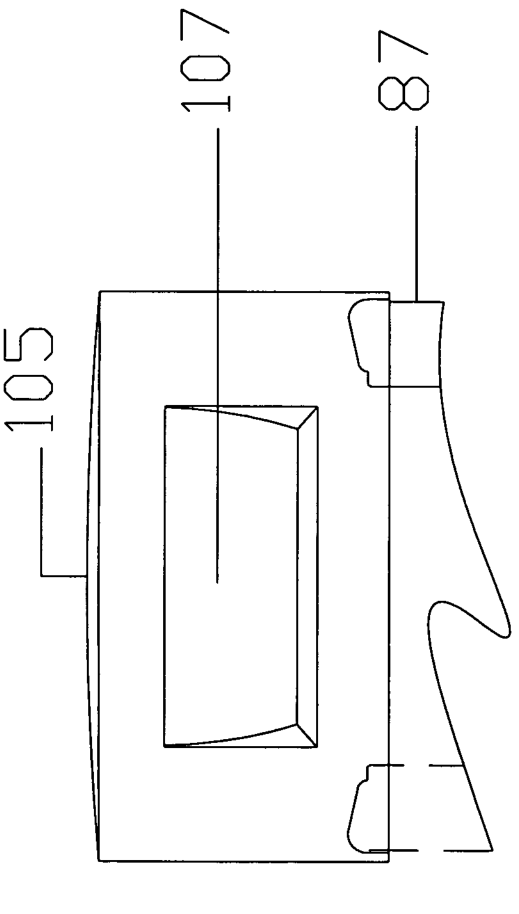
FIG. 19 shows a second alternate embodiment of the cap.

FIG. 17 shows a cap used to cover the alternate can 87. The outer wall may be notched to receive notches 88 in the cover. The cover has a door 106 which is below the cover top 105 and contacts a bottom wall 89 to expose the opening 107 as shown in FIGS. 18 and 18*a*, 19 and 19*a*.

The several bases also have layers 1 and 2 of compressible material continuous with those of the upper layers. The first layer 1 and at least one second layer 2 of compressible material has a modulus of elasticity (E) between 600 and 2400 psi and modulus of resilience between 12 and 36 in-lb per cubic inch. There may be layers with higher modulus and resilience interspersed with the existing layers or with other vertical center walls (such as are present with spiraling). The spiral walls or other walls may be rolled steel welded together with plates at the welds.

The first layer 1 and at least one second layer 2 may be comprised of materials having different phases from the group consisting of liquid, water, gas, inert gas and combinations thereof. Other methods may also be used in this fashion to force the blast to change thereby weakening the blast or to create and absorb shrapnel from a blast.

In order to accomplish the goals of the invention, the sides and bottom may have varying thickness of materials or shaped materials in the layers. The layers may intermix also. A hard layer may exist in conjunction with one or more layers which have lower modulus of elasticity, being surrounded with lower modulus layers of surrounding or on one side of a soft layers.

The bottoms and bases as described provide areas for layers of compression material between them just as the vertical walls do.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

We claim:

1. A garbage can for controlling the direction of an explosive charge comprised of:

a rigid outer shell having a base and an upwardly extending vertical side wall, a rigid inner shell having a base and an upwardly extending vertical side wall and defining an interior perimeter for receiving refuse or a removable refuse liner, and a rigid medial wall, disposed between the vertical side walls of the inner and outer shells, formed of a continuous, spiral-shaped material and having an interstitial space formed between the over-lapping spirals for receiving a non-rigid, compressible material.

2. A garbage can for controlling the direction of an explosive charge comprised of:

a rigid outer shell having a base and an upwardly extending vertical side wall, a rigid inner shell having a base and an upwardly extending vertical side wall and defining an interior perimeter for receiving refuse or a removable refuse liner, one or more rigid medial shells, disposed and spaced apart between the inner and outer shells, each medial shell having a base and an upwardly extending vertical side wall, and a top ring for receiving and securing the top end of the outer, inner and medial shell side walls, and where the vertical side walls of at least one medial shell extend upwardly and outwardly from its base toward the outer shell to create vertically non-symmetrical interstitial spaces.

3. The garbage can of claim 2 wherein the vertical side wall of at least one of the medial shells is fabricated from a corrugated material to provide a variable radial distance of the medial shell wall from the axial center of the can.

4. The garbage can of claim 2 wherein the vertical side wall of at least one medial shell extends below the medial base and attaches to the base of the outer shell to provide additional lateral reinforcement of the medial side wall and additional weight support of the medial shell.

5. The garbage can of claim 2 wherein the side wall of the inner shell extends slightly above the top ring to substantially direct the heat and gases of an explosion away from the top surface of the top ring.

6. The garbage can of claim 2 further comprising a vertically positioned threaded bolt secured on one end to a flat surface supporting the can, a cylindrical channel along the axial center of the can extending from the interior perimeter through the base of the outer shell, a first nut having a top and bottom surface and diameter slightly larger than the threaded bolt, disposed inside the cylindrical channel and secured inside surface of the cylindrical channel, and a second nut for receiving the threaded bolt and securing the can to the flat surface by contact with the top surface of the first nut.

7. The garbage can of claim 2 further comprising a removable refuse liner conforming substantially to shape of the inner perimeter, a pair of locking pockets located near the base of the liner comprised of a tapered receiving channel, a lateral channel and a vertical resting channel, a pair of anchoring members having a first end secured to the inner shell near the base of the inner perimeter and a second end for traveling through the channels of the locking pockets during installation and removal of the liner from the inner perimeter.

8. The garbage can of claim 2 further comprising at least one anchoring pylon having a top end attached to the bottom of the side wall of the medial shell and a bottom end for insertion into a subsurface casing for allowing the can to be used a traffic bollard.

9. The garbage can of claim 2 where the non-rigid and compressible material layers are selected from the group consisting of rubber, asphalt, carbon foam, ash, shale, perlite, ceramics, or combinations thereof.

10. The garbage can of claim 2 where the inner, outer and medial shells are comprised of steel or materials of comparable strength, ductility and of sufficient thickness to substantially lessen the lateral translation of the blast energy and gases into the area adjacent to the can.

11. A garbage can for controlling the direction of an explosive charge comprised of:

a rigid outer shell having a base and an upwardly extending vertical side wall, a rigid inner shell having a base and an upwardly extending vertical side wall and defining an interior perimeter for receiving refuse or a removable refuse liner, one or more rigid medial shells, disposed and spaced apart between the inner and outer shells, each medial shell having a base and an upwardly extending vertical side wall of less height than the vertical side walls of the inner and outer shell, a top ring for receiving and securing the top end of the outer, inner shell side walls, and a plurality of non-rigid and compressible material layers disposed within the interstitial spaces defined by the inner, outer and medial shells.

12. A garbage can for controlling the direction of an explosive charge comprised of:

a rigid outer shell having a base and an upwardly extending vertical side wall, a rigid inner shell having a base and an upwardly extending vertical side wall and defining an interior perimeter for receiving refuse or a removable refuse liner, one or more rigid medial shells, disposed and spaced apart between the inner and outer shells, each media shell having a base and an upwardly extending vertical side wall, a top ring for receiving and securing the top end of the outer, inner and medial shell side walls, a plurality of non-rigid and compressible material layers disposed within the interstitial spaces defined as the spaces between the inner, outer and medial shell walls wherein the non-rigid and compressible material layers within the interstitial spaces are dissimilar and comprised of a gaseous, liquid or solid phase.

* * * * *